(12) United States Patent
Choi et al.

(10) Patent No.: US 11,867,904 B2
(45) Date of Patent: Jan. 9, 2024

(54) METHOD AND ELECTRONIC DEVICE FOR PROVIDING AUGMENTED REALITY ENVIRONMENT

(71) Applicant: Samsung Electronics Co., Ltd., Suwon-si (KR)

(72) Inventors: Yeeun Choi, Suwon-si (KR); Harkjoon Kim, Suwon-si (KR); Sangyoon Lee, Suwon-si (KR); Donghee Kang, Suwon-si (KR); Yungjeong Ji, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 105 days.

(21) Appl. No.: 17/540,906

(22) Filed: Dec. 2, 2021

(65) Prior Publication Data

US 2022/0197028 A1 Jun. 23, 2022

Related U.S. Application Data

(63) Continuation of application No. PCT/KR2021/016763, filed on Nov. 16, 2021.

(30) Foreign Application Priority Data

Dec. 18, 2020 (KR) .................. 10-2020-0178677

(51) Int. Cl.
*G02B 27/01* (2006.01)
*G06T 19/00* (2011.01)
(Continued)

(52) U.S. Cl.
CPC .......... *G02B 27/017* (2013.01); *G06F 3/013* (2013.01); *G06F 3/0346* (2013.01);
(Continued)

(58) Field of Classification Search
CPC .............. G02B 27/0093; G02B 27/017; G02B 2027/0138; G06F 16/5866; G06F 16/7867;
(Continued)

(56) References Cited

U.S. PATENT DOCUMENTS 9,183,807 B2 11/2015 Small et al.
9,318,151 B2 4/2016 Lee et al.
(Continued)

FOREIGN PATENT DOCUMENTS

CN 110286772 A 9/2019
JP 2002-252844 A 9/2002
(Continued)

OTHER PUBLICATIONS

International Search Report dated Feb. 25, 2022, issued in International Patent Application No. PCT/KR2021/016763.

*Primary Examiner* — Nelson M Rosario
(74) *Attorney, Agent, or Firm* — Jefferson IP Law, LLP

(57) ABSTRACT

An electronic device that is wearable on a part of a body of a user is provided. The electronic device includes a camera, a display, a memory, and a processor. The memory may store instructions which, when executed, cause the processor to obtain a plurality of consecutive images by using the camera based on a first user input of the user, identify an external object from an image obtained by using the camera, identify a specific area on the external object specified by a second user input of the user from the image, extract at least one image from the plurality of consecutive images and associate the at least one image with the specific area, and display the at least one image associated with the specific area in augmented reality on the display when receiving a third user input of the user corresponding to the specific area.

19 Claims, 19 Drawing Sheets

(51) Int. Cl.
*G06V 20/40* (2022.01)
*G06F 3/0346* (2013.01)
*G06F 3/01* (2006.01)
*G06F 16/78* (2019.01)
*G06F 3/0354* (2013.01)

(52) U.S. Cl.
CPC ...... *G06F 3/03545* (2013.01); *G06F 16/7867* (2019.01); *G06T 19/006* (2013.01); *G06V 20/47* (2022.01); *G02B 2027/0138* (2013.01)

(58) Field of Classification Search
CPC .......... G06F 3/012; G06F 3/013; G06F 3/017; G06F 3/0346; G06F 3/03545; G06T 19/006; G06V 10/7788; G06V 10/945; G06V 20/20; G06V 20/47
See application file for complete search history.

(56) References Cited

U.S. PATENT DOCUMENTS

| | | | |
|---|---|---|---|
| 9,697,648 B1 | 7/2017 | Ivers et al. | |
| 9,959,681 B2 | 5/2018 | Jeong | |
| 10,082,940 B2 | 9/2018 | Ivers et al. | |
| 11,526,004 B2 | 12/2022 | Koo et al. | |
| 2012/0105703 A1 | 5/2012 | Lee et al. | |
| 2012/0223966 A1 | 9/2012 | Lim | |
| 2013/0147687 A1 | 6/2013 | Small et al. | |
| 2017/0186230 A1 | 6/2017 | Ivers et al. | |
| 2017/0200314 A1 | 7/2017 | Jeong | |
| 2018/0011578 A1 | 1/2018 | Choi et al. | |
| 2018/0114366 A1 | 4/2018 | Ivers et al. | |
| 2019/0065027 A1* | 2/2019 | Hauenstein | G06F 3/04815 |
| 2019/0102943 A1* | 4/2019 | Fillhardt | G06T 19/003 |
| 2020/0202629 A1 | 6/2020 | Sharma et al. | |
| 2020/0326775 A1 | 10/2020 | Koo et al. | |
| 2021/0407211 A1 | 12/2021 | Yi et al. | |

FOREIGN PATENT DOCUMENTS

| | | | |
|---|---|---|---|
| KR | 10-2012-0046991 A | 5/2012 | |
| KR | 10-2012-0074669 A | 7/2012 | |
| KR | 10-2015-0017564 A | 2/2015 | |
| KR | 10-2020-0109812 A | 9/2020 | |
| WO | 2020/250110 A1 | 12/2020 | |

* cited by examiner

METHOD AND ELECTRONIC DEVICE FOR PROVIDING AUGMENTED REALITY ENVIRONMENT

CROSS-REFERENCE TO RELATED APPLICATION(S)

This application is a continuation application, claiming priority under § 365(c), of an International application No. PCT/KR2021/016763, filed on Nov. 16, 2021, which is based on and claims the benefit of a Korean patent application number 10-2020-0178677, filed on Dec. 18, 2020, in the Korean Intellectual Property Office, the disclosure of which is incorporated by reference herein in its entirety.

TECHNICAL FIELD

The disclosure relates to a method and an electronic device for providing an augmented reality (AR) environment.

BACKGROUND ART

An electronic device may provide an augmented reality (AR) environment by overlapping and showing a virtual object on an image of a real environment. For example, an electronic device may provide an AR environment that provides additional information that it is difficult to obtain only in the real world by synthesizing a virtual object in the real environment. Unlike virtual reality which is assumed as a complete virtual world, augmented reality in which a virtual object is added to the real world may increase a user's sense of reality.

The electronic device may be a device that is wearable on a part of the user's body. For example, the electronic device may be a head mounted display (HMD) device that is wearable on a user's head. For example, the electronic device may be implemented in a shape similar to glasses. The electronic device may provide augmented reality environment to a user by displaying information on an external environment viewed by the user through the lens of glasses on at least a partial area of the lens.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may provide augmented reality content by recognizing a marker generated by a content author. According to an embodiment, the augmented reality content may include virtual content mapped to an external object. In this case, the user may consume only the augmented reality content created by the content author, and may consume the augmented reality content by limiting it to a marker created by the content author. However, the augmented reality content desired by the user of the electronic device and the time point at which the user of the electronic device desires to be provided with the desired augmented reality content may be different from the augmented reality content generated by the content author and the provision time of the augmented reality content determined by the content author.

Aspects of the disclosure are to address at least the above-mentioned problems and/or disadvantages and to provide at least the advantages described below. Accordingly, an aspect of the disclosure is to provide an electronic device capable of independently generating augmented reality content by a user and providing the augmented reality content at a time desired by the user. In addition, a user may desire to easily view or edit the augmented reality content directly created by the user.

Another aspect of the disclosure in the document is to provide an electronic device and method for solving the above-described problems.

Additional aspects will be set forth in part in the description which follows and, in part, will be apparent from the description, or may be learned by practice of the presented embodiments.

Technical Solution

In accordance with an aspect of the disclosure, an electronic device that is wearable on a part of a body of a user is provided. The electronic device includes a camera, a display, a memory, and a processor operatively connected to the camera, the display and the memory, wherein the memory stores one or more instructions which, when executed, cause the processor to obtain a plurality of consecutive images by using the camera based on a first user input of the user, identify an external object from an image obtained by using the camera, identify a specific area on the external object specified by a second user input of the user from the image, extract at least one image from the plurality of consecutive images and associate the at least one image with the specific area, and display the at least one image associated with the specific area in augmented reality on the display when receiving a third user input of the user corresponding to the specific area.

In accordance with another aspect of the disclosure, an electronic device that is wearable on a part of a body of a user is provided. The electronic device includes a camera, a communication circuit, a display, a memory, and a processor operatively connected to the camera, the communication circuit, the display and the memory, wherein the memory stores one or more instructions which, when executed, cause the processor to receive a plurality of consecutive images from a first external electronic device by using the communication circuit based on a first user input of the user, identify an external object from an image obtained by using the camera, identify a specific area on the external object specified by a second user input of the user from the image, extract at least one image from the plurality of consecutive images and associate the at least one image with the specific area, and display the at least one image associated with the specific area in augmented reality on the display when receiving a third user input of the user corresponding to the specific area.

In accordance with another aspect of the disclosure, a method of providing an augmented reality environment of an electronic device that is wearable on a part of a body of a user is provided. The method includes obtaining a plurality of consecutive images by using a camera based on a first user input of the user, identifying an external object from an image obtained by using the camera, identifying a specific area on the external object specified by a second user input of the user from the image, extracting at least one image from the plurality of consecutive images and associating the extracted at least one image with the specific area, and displaying the at least one image associated with the specific area in augmented reality on a display when receiving a third user input of the user corresponding to the specific area.

Advantageous Effects

According to various embodiments disclosed in this document, it is possible to provide an electronic device and method in which a user can directly create virtual content to be mapped to an external object and map the virtual content to a desired area on the external object.

According to various embodiments disclosed in this document, it is possible to provide an electronic device and method for editing virtual content mapped to an external object and supporting easy viewing of virtual content mapped to the external object.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
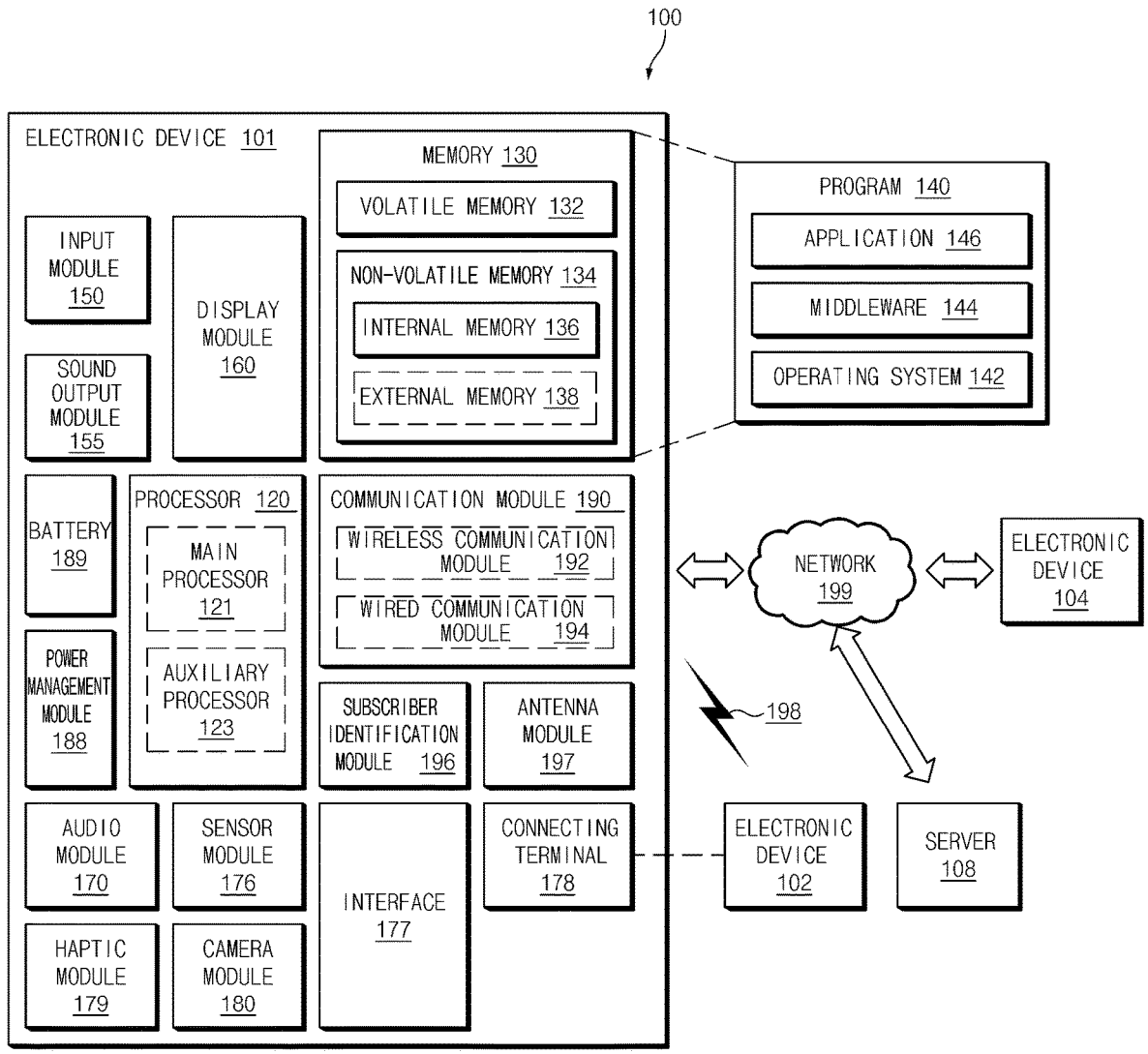
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
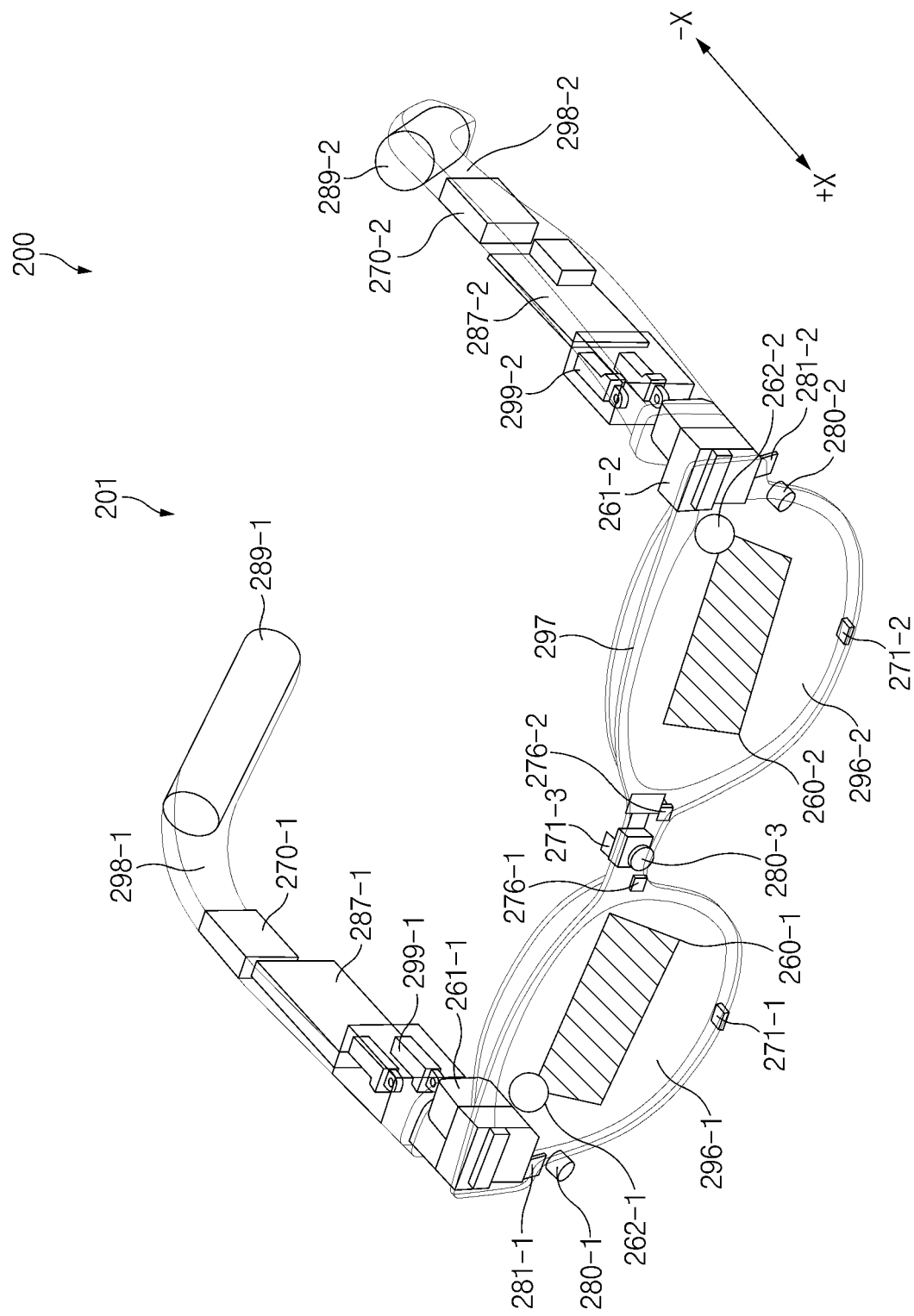
FIG. 2 is a schematic diagram of an electronic device according to an embodiment of the disclosure.

FIG. 2 is a schematic diagram of an electronic device according to an embodiment of the disclosure.

Referring to FIG. 2, in a schematic diagram 200 of an electronic device 201, the electronic device 201 may be referred to as a head mounted display (HMD) device, a wearable device, smart glasses, or an eyewear. The shape of the electronic device 201 illustrated in FIG. 2 is an example shape, and embodiments of the disclosure are not limited thereto. For example, the electronic device 201 may be an electronic device configured to provide augmented reality (AR) or virtual reality (VR).

According to an embodiment, the electronic device 201 may include at least some of the components of the electronic device 101 of FIG. 1. For example, the electronic device 201 may include at least one of a display (e.g., the display module 160 of FIG. 1), a camera (e.g., the camera module 180 of FIG. 1), at least one sensor (e.g., the sensor module 176 of FIG. 1), a processor (e.g., the processor 120 in FIG. 1), a battery (e.g., the battery 189 of FIG. 1), a memory (e.g., the memory 130 of FIG. 1), or a communication circuit (e.g., the communication module 190 of FIG. 1). At least some of the components of the electronic device 201 may be located inside a housing of the electronic device 201 or may be exposed to the outside of the housing.

The electronic device 201 may include a display. For example, the electronic device 201 may include a first display 261-1 and/or a second display 261-2. The first display 261-1 and/or the second display 261-2 may include at least one of a liquid crystal display (LCD), a digital mirror device (DMD), a liquid crystal on silicon display (LCoS device), an organic light emitting diode (OLED), or a micro light emitting diode (micro LED). For example, the display of the electronic device 201 may include at least one light source for irradiating light. When the first display 261-1 and/or the second display 261-2 may include one of a liquid crystal display device, a digital mirror device, or an LCoS device, the electronic device 201 may include at least one light source for irradiating light to a first screen output area 260-1 and/or a second screen output area 260-2 of a display. For another example, when the display of the electronic device 201 can generate light by itself, the display may not include a light source other than the light source included in the display. When the first display 261-1 and/or the second display 261-2 includes at least one of an organic light emitting diode and a micro LED, the electronic device 201 may provide an image to a user even through a separate light source is not included. When the display is implemented as an organic light emitting diode or micro LED, the weight of the electronic device 201 may be reduced by omitting the separate light source.

According to an embodiment, the electronic device 201 may include a first transparent member 296-1 and/or a second transparent member 296-2. For example, when the user wears the electronic device 201, the user may see through the first transparent member 296-1 and/or the second transparent member 296-2. The first transparent member 296-1 and/or the second transparent member 296-2 may be formed of at least one of a glass plate, a plastic plate, or a polymer, and may be transparent or translucent. For example, when worn, the first transparent member 296-1 may be arranged to face the user's right eye, and the second transparent member 296-2 may be arranged to face the user's left eye.

According to an embodiment, at least a portion of the first transparent member 296-1 and/or the second transparent member 296-2 may be an optical waveguide. For example, the optical waveguide may transmit an image generated by a display (e.g., the first display 261-1 and/or the second display 261-2) to the user's eyes. The optical waveguide may be formed of glass, plastic, or polymer. For example, the optical waveguide may include a nanopattern (e.g., a polygonal or curved grating structure) formed therein or on one surface. For example, the light incident upon one end of the optical waveguide may be propagated inside the optical waveguide by the nanopattern and provided to the user's eyes. For example, an optical waveguide configured with a free-form prism may be configured to provide incident light to a user through a reflection mirror.

According to an embodiment, the optical waveguide may include at least one of at least one diffractive element (e.g., a diffractive optical element (DOE), a holographic optical element (HOE)) or a reflective element (e.g., a reflective mirror). The optical waveguide may guide the display light emitted from the light source to the user's eyes by using at least one diffractive element or a reflective element included in the optical waveguide. For example, the diffractive element may include an input optical member (e.g., a first input optical member 262-1 and/or a second input optical member 262-2) and/or an output optical member (not shown). The first input optical member 262-1 and/or the second input optical member 262-2 may be referred to as an input grating area, and the output optical member (not shown) may be referred to as an output grating area. The input grating area may diffract or reflect light to transmit light output from a light source (e.g., a micro LED) to a transparent member (e.g., the first transparent member 296-1 and/or the second transparent member 296-2) of the screen display device. The output grating area may diffract or reflect the light transmitted to the transparent member (e.g., the first transparent member 296-1 and/or the second transparent member 296-2) of the optical waveguide in the direction of the user's eyes. For example, the reflective element may include a total reflection optical element or a total reflection waveguide for total internal reflection (TIR). The total internal reflection may be referred to as one scheme of guiding light, and may mean that an angle of incidence is created such that the light (e.g., an image) input through an input grating area is 100% reflected on one surface (e.g., a specific surface) of the optical waveguide to transmit 100% of the light to the output grating area. In an embodiment, the optical path of the light emitted from the display may be guided to the optical waveguide by the input optical member. The light moving inside the optical waveguide may be guided toward the user's eyes through the output optical member. The first screen output area 260-1 and/or the second screen output area 260-2 may be determined based on the light emitted in the direction of eyes.

Although it has been described in FIG. 2 that the electronic device 201 provides an image to a user by using an optical waveguide, the embodiments of the disclosure are not limited thereto. According to an embodiment, the display of the electronic device 201 may be a transparent or semi-transparent display. In this case, the display may be arranged at a location facing the user's eyes (e.g., the first screen output area 260-1 and/or the second screen output area 260-2).

According to an embodiment, the electronic device 201 may include at least one camera. For example, the electronic device 201 may include a first camera 280-1, a second camera 280-2, and/or a third camera 280-3. For example, the first camera 280-1 and the second camera 280-2 may be used for external image recognition. The first camera 280-1 and the second camera 280-2 may be set to obtain an image corresponding to a direction (e.g., +x direction) corresponding to the user's gaze. The electronic device 201 may use the first camera 280-1 and the second camera 280-2 to perform head tracking (e.g., 3 degrees of freedom or 6 degrees of freedom (DoF) tracking), hand image detection, hand image tracking, and/or spatial recognition. For example, the first camera 280-1 and the second camera 280-2 may be global shutter (GS) cameras that have the same standard and performance (e.g., an angle of view, a shutter speed, resolution, the number of color bits, and the like). The electronic device 201 may support a simultaneous localization and mapping (SLAM) technology by performing spatial recognition (e.g., 6-DoF spatial recognition) and/or depth information acquisition by using stereo cameras disposed at the left and right sides. In addition, the electronic device 201 may recognize the user's gesture by using stereo cameras arranged on the left/right sides. The electronic device 201 may detect a faster hand gesture and fine movement by using a GS camera with relatively less distortion than a rolling shutter (RS) camera. For example, the third camera 280-3 may be used to recognize an external image. The third camera 280-3 may be set to obtain an image corresponding to a direction (e.g., a +x direction) corresponding to the user's gaze. In an example, the third camera 280-3 may be a camera having a relatively higher resolution than those of the first camera 280-1 and the second camera 280-2. The third camera 280-3 may be referred to as a high resolution (HR) camera or a photo video (PV) camera. The third camera 280-3 may support a function of obtaining a high-quality image, such as auto focus (AF) and/or optical image stabilization (OIS). The third camera 280-3 may be a GS camera or an RS camera.

According to an embodiment, the electronic device 201 may include at least one eye-tracking sensor. For example, the electronic device 201 may include a first eye-tracking sensor 276-1 and a second eye-tracking sensor 276-2. For example, the first eye-tracking sensor 276-1 and the second eye-tracking sensor 276-2 may be cameras set to obtain an image in a direction corresponding to the user's eyes. The first eye-tracking sensor 276-1 and the second eye-tracking sensor 276-2 may be set to obtain a user's right eye image and a user's left eye image, respectively. The electronic device 201 may be set to detect the user's pupil by using the first eye-tracking sensor 276-1 and the second eye-tracking sensor 276-2. The electronic device 201 may obtain the user's gaze from the user's pupil image and provide the image based on the obtained gaze. For example, the electronic device 201 may display the image such that the image is located in the user's gaze direction. For example, the first eye-tracking sensor 276-1 and the second eye-tracking sensor 276-2 may be GS cameras that have the same specifications and performance (e.g., an angle of view, a shutter speed, a resolution, the number of color bits, and the like).

According to an embodiment, the electronic device 201 may include at least one illumination unit. The illumination unit may include, for example, at least one LED. In FIG. 2, the electronic device 201 may include a first illumination unit 281-1 and a second illumination unit 281-2. For example, the electronic device 201 may use the first illumination unit 281-1 and the second illumination unit 281-2 to provide auxiliary illumination for the first camera 280-1, the second camera 280-2, and/or the third camera 280-3. In an example, the electronic device 201 may provide illumination for obtaining a pupil image by using an illumination unit (not shown). For example, the electronic device 201 may provide illumination for the eye-tracking sensor by using an infrared wavelength LED. In this case, the eye-tracking sensor may include an image sensor for obtaining an infrared wavelength image.

According to an embodiment, the electronic device 201 may include at least one printed circuit board (PCB). For example, the electronic device 201 may include a first PCB 287-1 located in a first temple 298-1 and a second PCB 287-2 located in a second temple 298-2. The first PCB 287-1 and/or the second PCB 287-2 may be electrically connected to other components of the electronic device 201 through a signal line and/or a flexible PCB (FPCB). For example, a communication circuit, a memory, at least one sensor, and/or a processor may be arranged on the first PCB 287-1 and/or the second PCB 287-2. For example, each of the first PCB 287-1 and the second PCB 287-2 may include a plurality of PCBs spaced apart from each other by an interposer.

According to an embodiment, the electronic device 201 may include at least one battery. For example, the electronic device 201 may include a first battery 289-1 located at one end of the first temple 298-1 and a second battery 289-2 located at one end of the second temple 298-2. The first battery 289-1 and the second battery 289-2 may be set to supply power to components of the electronic device 201.

According to an embodiment, the electronic device 201 may include at least one speaker. For example, the electronic device 201 may include a first speaker 270-1 and a second speaker 270-2. The electronic device 201 may be set to provide stereo sound by using speakers located at the left and right sides.

According to an embodiment, the electronic device 201 may include at least one microphone. For example, the electronic device 201 may include a first microphone 271-1, a second microphone 271-2, and/or a third microphone 271-3. The first microphone 271-1 may be located at the right side of a frame 297, the second microphone 271-2 may be located at the left side of the frame 297, and the third microphone 271-3 may be located on the bridge of on the frame 297. In an example, the electronic device 201 may perform beamforming by using the first microphone 271-1, the second microphone 271-2, and/or the third microphone 271-3.

According to an embodiment, the electronic device 201 may include the first temple -298-1, the second temple -298-2, and the frame 297. The first temple 298-1, the second temple 298-2, and the frame 297 may be referred to as a housing. The first temple 298-1 may be physically connected to the frame 297 through a first hinge portion 299-1, and may support the frame 297 when worn. The second temple 298-2 may be physically connected to the frame 297 through a second hinge portion 299-2, and may support the frame 297 when worn.

The configuration of the above-described electronic device 201 is an example configuration, and embodiments of the disclosure are not limited thereto. For example, the electronic device 201 may not include at least some of the components described with reference to FIG. 2, or may further include components other than the components described. For example, the electronic device 201 may include at least one sensor (e.g., an acceleration sensor, a gyro sensor, and/or a touch sensor) and/or an antenna.

Figure 3:
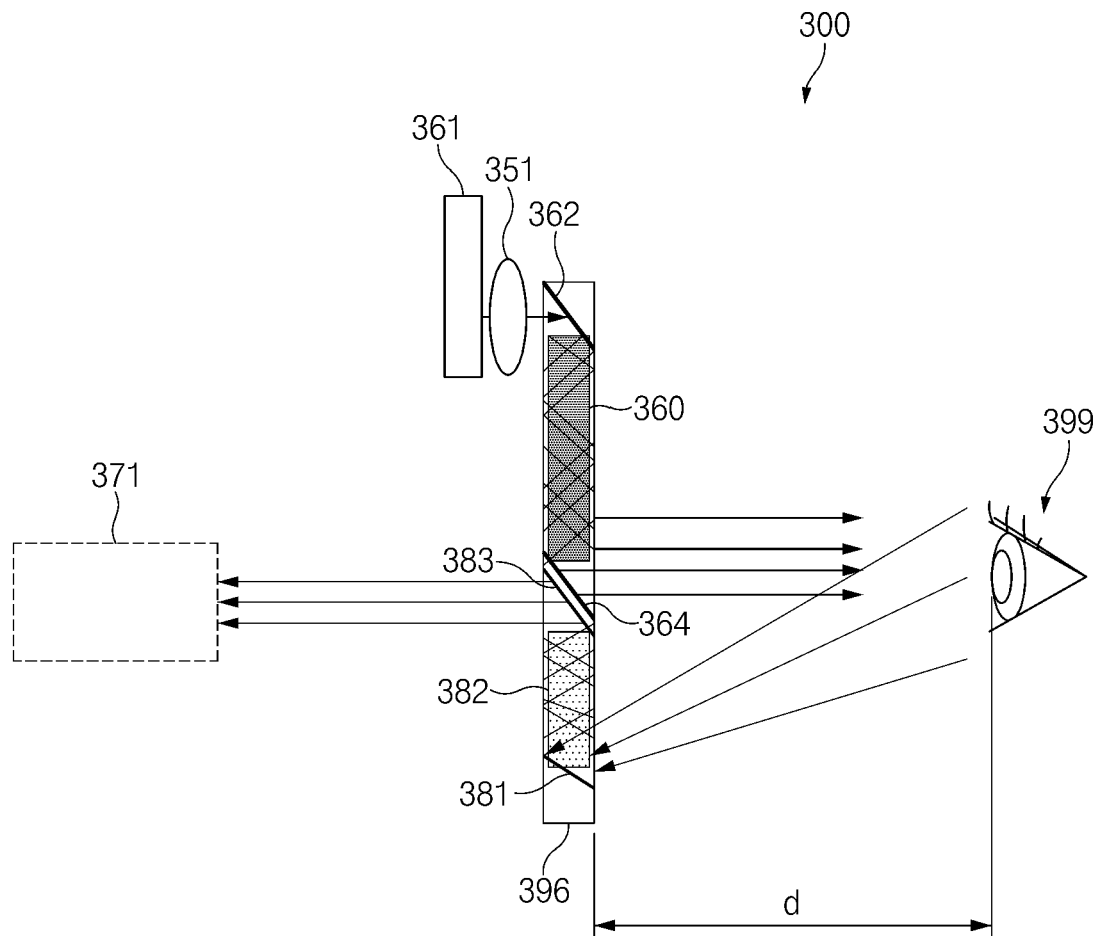
FIG. 3 is a schematic diagram of a method of tracking and displaying gaze through a transparent member according to an embodiment of the disclosure.

FIG. 3 is a schematic diagram of a method of tracking and displaying gaze through a transparent member according to an embodiment of the disclosure.

Referring to FIG. 3, in schematic diagram 300 a display 361 (e.g., a first display 261-1 or a second display 261-2 of FIG. 2) may provide an image through a transparent member 396 (e.g., the first transparent member 296-1 or the second transparent member 296-2). According to an embodiment, the display 361 may input light corresponding to an image to an input optical member 362 (e.g., the first input optical member 262-1 or the second input optical member 262-2 of FIG. 2) through a lens 351. The input optical member 362 may reflect or diffract the incident light to input the incident light to an optical waveguide 360. An output optical member 364 may output the light transmitted through the optical waveguide 360 in the direction of at least one of a user's eyes 399. In one example, the lens 351 may be included in the display 361. In an example, the location of the lens 351 may be determined based on the distance between the transparent member 396 and the user's eyes 399.

An eye-tracking sensor 371 (e.g., the first eye-tracking sensor 276-1 or the second eye-tracking sensor 276-2 of FIG. 2) may obtain an image corresponding to at least a part of the user's eyes 399. For example, the light corresponding to the image of the user's eyes 399 may be reflected and/or diffracted through a first splitter 381 to be input to an optical waveguide 382. The light transmitted to a second splitter 383 through the optical waveguide 382 may be reflected and/or diffracted by the second splitter 383 to be output in the direction of the eye-tracking sensor 371.

Hereinafter, a configuration of an electronic device according to an embodiment will be described with reference to FIG. 4.

Figure 4:
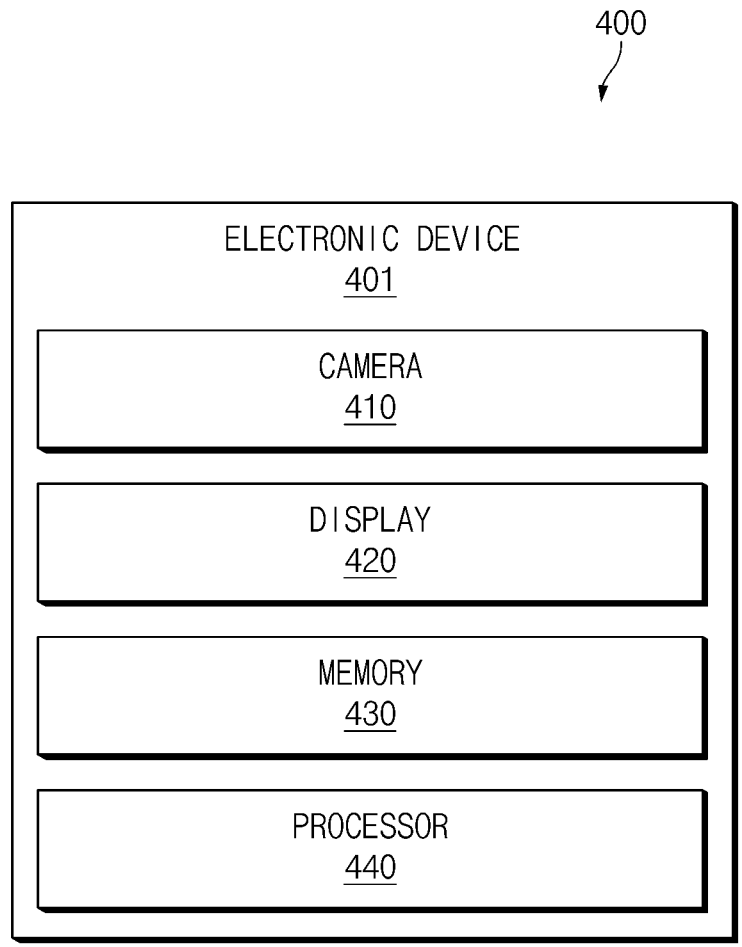
FIG. 4 is a block diagram of an electronic device according to an embodiment of the disclosure.

FIG. 4 is a block diagram of an electronic device according to an embodiment of the disclosure.

Referring to FIG. 4, in block diagram 400 an electronic device 401 (e.g., an electronic device 201 of FIG. 2) may include a camera 410 (e.g., the camera module 180 of FIG. 1), a display 420 (e.g., a display module 160 of FIG. 1), a memory 430 (e.g., a memory 130 of FIG. 1), and a processor 440 (e.g., a processor 120 of FIG. 1). The processor 440 may be operatively connected to other components of the electronic device 401 and control various operations of the electronic device 401. The processor 440 may perform various operations of the electronic device 401 by executing one or more instructions stored in the memory 430. Hereinafter, operations described as being performed by the electronic device 401 may be referred to as being performed by the processor 440. The memory 430 may be operatively connected to at least the processor 440 and store instructions. The memory 430 may store various types of information. For example, the memory 430 may at least temporarily store an image and/or a video photographed by the camera 410.

According to an embodiment, the electronic device 401 may be wearable on a part of the user's body. According to an embodiment, the electronic device 401 may include the camera 410. The camera 410 may include at least one camera. According to an embodiment, the camera 410 may include a first camera and a second camera. According to an embodiment, when the electronic device 401 is worn by the user, the first camera provides an image (e.g., two-dimensional and/or three-dimensional images) in a direction (e.g., the +x direction in FIG. 2) corresponding to the user's gaze. According to an embodiment, the second camera may be set to obtain an image corresponding to a specified direction. The specified direction may include a direction different from a direction corresponding to the user's gaze. According to an embodiment, at least a part of the photographing area of the second camera may include an area other than the photographing area of the first camera.

According to an embodiment, the first camera may include at least one of an RGB camera and/or a camera supporting a SLAM function. According to an embodiment, the second camera may include an RGB camera.

According to an embodiment, the electronic device 401 may include the display 420. The display 420 may provide an augmented reality (AR) environment to a user. The display 420 may include a transparent or translucent display area. A user may view an image of an external environment through the display area. For example, the display 420 may be a transparent display positioned adjacent to the front of the user's eyeball. As another example, the display 420 may be set to project an image on a transparent display area located adjacent to the front of the user's eyeball. For the structure of the display 420, the description of the structure of the display described above with reference to FIGS. 2 and 3 may be referred to.

In the disclosure, a field of view (FOV) may mean a range in which a user can see without moving his or her eyes when gazing at a certain point. In the disclosure, a field of view of a camera may be referred to as at least a part of an image obtained by an image sensor of the camera through a lens of the camera. Hereinafter, an image corresponding to the field of view of a user may be referred to as an image having a range similar to the image range included in the field of view of the user.

According to an embodiment, the electronic device 401 may include the processor 440. The processor 440 may recognize an external object corresponding to the user's gaze or the user's gaze direction by using the camera 410. For example, the processor 440 may obtain an image corresponding to the field of view of a user by using the camera 410, and recognize an external object corresponding to the gaze or the gaze direction of a user from the obtained image. According to an embodiment, the external object may include a physical object that is tangible by a user. As an example, the external object may be a printed matter such as a book, newspaper, magazine, or a workbook, or a page thereof. As another example, the external object may be an electronic document or a screen of a device displaying the electronic document. According to various embodiments disclosed herein, an external object, which is a document for providing information, may include at least one page, and may include an electronic document and a non-electronic document.

According to an embodiment, the processor 440 may obtain an image of an external object corresponding to the gaze or gaze direction of a user by using the first camera. The processor 440 may obtain a 2D or 3D image of an external object by using the first camera, and extract a feature point from the obtained image. According to an embodiment, the processor 440 may identify the external object based on the feature points extracted from the image of the external object. According to an embodiment, the processor 440 may identify at least one page included in the external object based on the feature point. For example, the processor 440 may identify at least one of a page number of at least one page in the image of an external object acquired using the first camera, and/or at least one content (e.g., a letter, number, figure, image, graph, or table) included in the page.

According to an embodiment, the processor 440 may associate virtual content to be displayed in augmented reality with an external object and/or a specific area on the external object based on the feature points extracted from the image of the external object. According to an embodiment, the operation of the processor 440 associating the virtual content with the external object and/or the specific area on the external object may be referred to as an operation of the processor 440 creating an association relationship between the virtual content and the specific area on the external object. The operation of the processor 440 associating the virtual content disclosed in the disclosure with an external object and/or a specific area on the external object may be referred to as an operation of the processor 440 mapping the virtual content to the external object and/or the specific area on the external object. The processor 440 may display the virtual content associated with an external object through the display 420, such that it is possible to provide an augmented reality (AR) environment, in which the virtual content overlaps the real environment corresponding to the field of view of a user, to the user. In the disclosure, the virtual content associated with or to be associated with an external object may include at least one image obtained by the processor 440 using the second camera.

According to an embodiment, the processor 440 may obtain an image corresponding to a specified direction by using the second camera. The processor 440 may obtain a plurality of consecutive images by using the second camera. For example, the processor 440 may obtain a video corresponding to a specified direction by using the second camera. According to an embodiment, the image obtained by the second camera as the specified direction deviates more than a specified range based on the gaze or gaze direction of a user may include an image that does not correspond to the field of view of the first camera or the field of view of the user.

According to an embodiment, the processor 440 may obtain a plurality of consecutive images by using the camera 410 based on the user input of a user. According to an embodiment, the processor 440 may activate the second camera based on a user input received from the user of the electronic device 401 and start to obtain an image by using the second camera. The processor 440 may obtain the plurality of consecutive images by using the second camera in response to the user input. For example, the processor 440 may use the second camera from a time point of receiving a user input for starting acquisition of the plurality of continuous images to a time point of receiving a user input for terminating acquisition of the plurality of consecutive images, thereby obtaining the plurality of consecutive images. The processor 440 may at least temporarily store the plurality of consecutive images obtained in the memory 430.

The virtual content to be associated with the external object may include at least one image extracted from the plurality of consecutive images obtained by using the second camera. For example, the virtual content to be associated with the external object may include a video clip that is a part of a video obtained by using the second camera.

Although not shown in FIG. 4, the electronic device 401 may further include a microphone (not shown). When obtaining the plurality of consecutive images by using the camera 410, the processor 440 may receive surrounding sound (outside the electronic device 401) at the time of obtaining the plurality of consecutive images by using a microphone (not shown), thereby obtaining audio data. For example, the processor 440 may activate the second camera and the microphone (not shown) based on a user input, obtain video data by using the second camera, and receive audio data by using the microphone (not shown). The processor 440 may at least temporarily store the obtained video data and audio data in the memory 430, respectively, or synthesize and at least temporarily store the obtained video data and audio data in the memory 430. In the disclosure, the virtual content (e.g., a video clip) that the processor 440 associates with an external object may include video data and audio data.

According to an embodiment, the processor 440 may extract at least one image to be associated with the external object among a plurality of consecutive images based on a user input. The user input may include an input for specifying an area on an external object. For example, the user input may be a gesture input of a user pointing to an area on an external object or a gesture input (e.g., writing or drawing using an actual pen) of a user drawing a specified form on an area on the external object. As another example, the user input may be a gesture input using an electronic pen communicating with the electronic device 401 or a button input using a button provided in the electronic pen. As still another example, the user input may include a user's gaze of looking at an area on an external object and an utterance with which an operation of extracting at least one image obtained by the second camera is mapped.

According to an embodiment, the processor 440 may recognize the user's gesture by using the first camera. The processor 440 may detect a user input for specifying a specific area on an external object based on gesture recognition using the first camera. According to an embodiment, the processor 440 may extract at least one image, which is obtained from a time point when a user input of specifying a specific area on an external object is input, from a plurality of consecutive images obtained by the second camera. The processor 440 may extract at least one image corresponding to a section from an input time of the user input to a predetermined end time from the plurality of consecutive images obtained by the second camera. For example, the processor 440 may extract a part of the video corresponding to a section from a time point of inputting a user input for specifying a specific area on an external object to a predetermined end time point from the video obtained by the second camera, thereby generating a video clip.

For example, the predetermined end time point may be a time point when a specified time has elapsed from the input time point of the first input of a user for associating the virtual content with the specific area on the external object. As another example, the predetermined end time point may be a time point when a second input of a user for terminating the extraction of the virtual content is input. According to an embodiment, the predetermined end time point may include at least one of a time point when the user's gaze is changed beyond a specified range, an input time point of a user's third input for associating a second virtual content different from the first virtual content associated with an external object by the first input with the external object, and a time point when the feature point of the external object recognized by the first camera is changed (e.g., when the external object is a book, the time point when the page of the book is turned). The input time point of the third input may be later than the input time point of the first input.

According to an embodiment, the processor 440 may detect a specific area on an external object corresponding to a user input from the image obtained by using the first camera, and associate the virtual content with the detected area. The specific area on the external object corresponding to the user input may include at least a partial area in the page of an external object. The specific area may be an area corresponding to a specific content which is specified by an input user among at least one content included in the page of the external object. For example, when the user input is a gesture pointing to a graph printed on a book, the processor 440 may associate the virtual content with an area corresponding to the graph. According to an embodiment, the processor 440 may map the virtual content to an area corresponding to the specific content corresponding to the user input among at least one content included in the specific page of the external object.

According to an embodiment, the processor 440 may associate at least one image extracted from a plurality of consecutive images obtained by using the second camera with the specific area on the external object recognized by using the first camera, based on the user input. For example, the processor 440 may associate a video clip corresponding to at least a part of a video obtained by using the second camera with a specific area on an external object specified by a user input. The video clip may correspond to a section from a time point when a user input for associating the virtual content to be displayed in augmented reality with a specific area on an external object is input to a predetermined end time point.

According to an embodiment, the processor 440 may at least temporarily store the plurality of consecutive images (e.g., a video) obtained by using the second camera in the memory 430. For example, the processor 440 may store at least one image (e.g., a video clip) extracted from the plurality of consecutive images in the memory 430. According to various embodiments, when the electronic device 401 includes a communication circuit (not shown) (e.g., the communication module 190 of FIG. 1), the processor 440 may use the communication circuit to transmit at least one of a plurality of consecutive images and/or at least one image extracted therefrom to an external electronic device (not shown). For example, the external electronic device may be a cloud server. The external electronic device may store a plurality of consecutive images transmitted from the electronic device 401 and/or at least one image extracted therefrom.

According to an embodiment, the processor 440 may store a timestamp when a user input for associating at least a part of a video obtained by using the second camera with a specific area on an area on an external object is detected or received in the memory 430, or transmit the timestamp to an external electronic device together with at least a portion of the video. At least a part of the video may correspond to a plurality of consecutive images obtained by the second camera or at least one image extracted therefrom. The external electronic device may store at least a part of the video transmitted from the electronic device 401 and a timestamp associated therewith.

According to an embodiment, when storing at least one image extracted from the plurality of consecutive images obtained by using the second camera, the processor 440 may store the metadata together. The metadata may be data associated with the virtual content for identifying or searching for the virtual content including the at least one image. According to an embodiment, the metadata may include at least one of information about a time point when the virtual content including the at least one image is generated, information about a place where the content is generated (e.g., global positioning system (GPS)), and/or obtained information about the virtual content. According to an embodiment, the obtained information about the virtual content may include at least one of information extracted from the virtual content by the processor and/or information about the virtual content that the processor receives from a user. For example, when the virtual content is a video clip obtained by recording a lecture, the processor 440 may store the video clip together with at least one of timestamp information when the video clip is generated, GPS information of the electronic device 401 when the video clip is generated, a lecturer, a teaching material used in the lecture, and/or other information obtained in relation to the lecture. According to an embodiment, the information on a time point when the virtual content is generated may correspond to a time point when the processor 440 detects or receives a user input for associating the virtual content with an external object.

According to an embodiment, the processor 440 may terminate acquisition of the image using the second camera based on the user input.

According to an embodiment, the processor 440 may identify an external object and/or a specific area on the external object from an image corresponding to the user's field of view obtained by using the first camera. The processor 440 may extract a feature point of an external object from the image, and identify the external object and/or a specific area on the external object based on the extracted feature point.

According to an embodiment, the processor 440 may receive a user input corresponding to a specific area on an external object. According to an embodiment, the user input may include a user input for displaying (or playing) virtual content associated with a specific area. For example, the user input may include a gesture input pointing to a specific area. As another example, the user input may include a gesture input pointing to a specific area by using an electronic pen communicating with the electronic device 401 and a button input received at a specified time interval from the gesture input by using the button provided in the electronic pen. As still another example, the user input may include an utterance which maps a user's gaze looking at a specific area and a specific area and an operation of displaying (or playing) the virtual content associated with a specific area. According to an embodiment, when receiving the user input, the processor 440 may display virtual content associated with a specific area on the external object in augmented reality on the display 420. The processor 440 may display a virtual object on the display 420, thereby displaying the virtual content associated with the specific area on the external object corresponding to the user's gaze in the AR environment. The processor 440 may provide additional information related to the specific content included in the specific area on the external object by displaying the virtual object corresponding to the virtual content associated with the specific area on the external object.

The electronic device 401 may enable the user to associate information to be additionally provided in relation to a specific area on the external object with the corresponding area in advance, and then, when the user views the specific area again, the electronic device 401 may augment and display the mapped virtual object on the corresponding area, thereby additionally providing information desired by the user. Accordingly, the user may be provided with additional information other than the information disclosed in the external object only with the external object at a time point when the user wants to receive the additional information (e.g., when an electronic device receives a user input corresponding to a specific area on an external object from the user).

According to an embodiment, the processor 440 may determine a location to display the virtual content associated with a specific area on the external object, based on a user input. The processor 440 may display, on the display 420, a user interface for receiving a user input for selecting a location to display a virtual object (e.g., an image of a video clip) corresponding to virtual content (e.g., a video clip) associated with a specific area on the external object. The processor 440 may determine the display location of the virtual object corresponding to the virtual content associated with the specific area on the external object based on the user input received through the user interface. The display location may include a location in the augmented reality environment provided by the processor 440 through the display 420. For example, the display location of the virtual object corresponding to the virtual content associated with the external object may include a surrounding area of a specific area on the external object, a surrounding area of the external object, a user-specified area, or a specified area in a space implemented as an AR environment. Hereinafter, a location to display the virtual content or a display location of a virtual object corresponding to the virtual content may be referred to as a reproduction area of the virtual content.

According to an embodiment, the processor 440 may edit virtual content associated with a specific area on an external object based on a user input. According to an embodiment, the processor 440 may change a playback section of a video clip associated with a specific area on an external object based on a user input. For example, the processor 440 may edit a video clip associated with a specific area on an external object by adjusting a section in which a video clip is extracted from the original video of the video clip based on a user input.

According to various embodiments, the processor 440 may add a virtual object (e.g., a memo, an icon, and/or an animation effect) to a video clip associated with a specific area on an external object based on a user input. The processor 440 may edit a video clip associated with a specific area on an external object by synthesizing the added virtual object into the video clip based on a user input.

According to an embodiment, the processor 440 may determine a playback format of a virtual content associated with a specific area on an external object, based on a user input. According to an embodiment, when the video clip associated with a specific area on an external object is reproduced, in response to a user input, the processor 440 may reproduce only the audio data of a video clip, only the video data of the video clip, or both video data and audio data of the video clip. According to various embodiments, the processor 440 may determine whether to display a virtual object synthesized in a video clip based on a user input.

According to an embodiment, the processor 440 may delete the virtual content associated with a specific area on an external object based on a user input. The operation of deleting, by the processor 440, the virtual content associated with the specific area on the external object may include an operation of deleting information indicating the association relationship generated between the specific area on the external object and the virtual content. For example, the operation of the processor 440 to delete virtual content associated with a specific area on the external object may include deleting virtual content data associated with the specific area on the external object from the memory 430.

According to an embodiment, the processor 440 may generate an index of at least one virtual content associated with an external object. According to an embodiment, the processor 440 may generate an index including page information including a specific area on an external object associated with a virtual content, and information for identification or retrieval of the virtual content associated with the specific area on the external object. For example, the page information may include a page number of a page including a specific area on an external object associated with a virtual content. For example, the information for identifying or searching for the virtual content may include annotation information including text data for briefly describing the virtual content. According to an embodiment, the information for identifying or searching for the virtual content may include metadata of the virtual content, such as information on a time point when the virtual content is created, information on a place where the virtual content is created, or obtained information related to the virtual content. According to various embodiments, the information for identifying or searching for the virtual content may include a preview content of the virtual content.

According to an embodiment, the processor 440 may display an index list including index information of at least one virtual content associated with an external object on the display 420. The processor 440 may identify an external object by using the first camera and display an index list corresponding to the identified external object on the display 420.

The electronic device 401 may provide the index information of the virtual content associated with the external object through the display 420, thereby enabling the user to easily view the virtual content associated with the external object.

According to an embodiment, the processor 440 may generate a bookmark corresponding to each page based on page information of at least one page including a specific area on an external object associated with each of at least one virtual content, and may display the bookmark on the display 420. By checking the bookmark through the display 420, the user may recognize that the specific area associated with at least one virtual content is included in the page to which the bookmark points. According to various embodiments, an operation of displaying the virtual content associated with a specific area included in a page indicated by the selected bookmark on the display 420 may be mapped to a user input for selecting the bookmark. For example, as a user input for selecting a bookmark is received, the processor 440 may display the virtual content associated with a specific area included in the page indicated by the bookmark on the display 420.

The electronic device 401 provides a bookmark corresponding to a page including a specific area on an external object associated with the virtual content for the external object, thereby facilitating the user to check the page in which the virtual content associated with the external object exists.

The component of the electronic device 401 shown in FIG. 4 is an example component, and various embodiments disclosed in the disclosure are not limited to the component shown in FIG. 4. For example, the electronic device 401 may further include a component not shown in FIG. 4. For example, the electronic device 401 may further include at least one of a microphone (not shown), a communication circuit (not shown) (e.g., the communication module 190 of FIG. 1), and/or a sensor circuit (not shown) (e.g., the eye-tacking sensor described with reference to FIG. 2). The information transmission/reception between the electronic device 401 and an external electronic device described above with reference to FIG. 4 may be performed based on a communication circuit (not shown). In addition, the gaze or gaze direction information of a user described above with reference to FIG. 4 may be obtained by using an eye-tracking sensor (not shown).

Hereinafter, a configuration of an electronic device according to an embodiment will be described with reference to FIG. 5.

Figure 5:
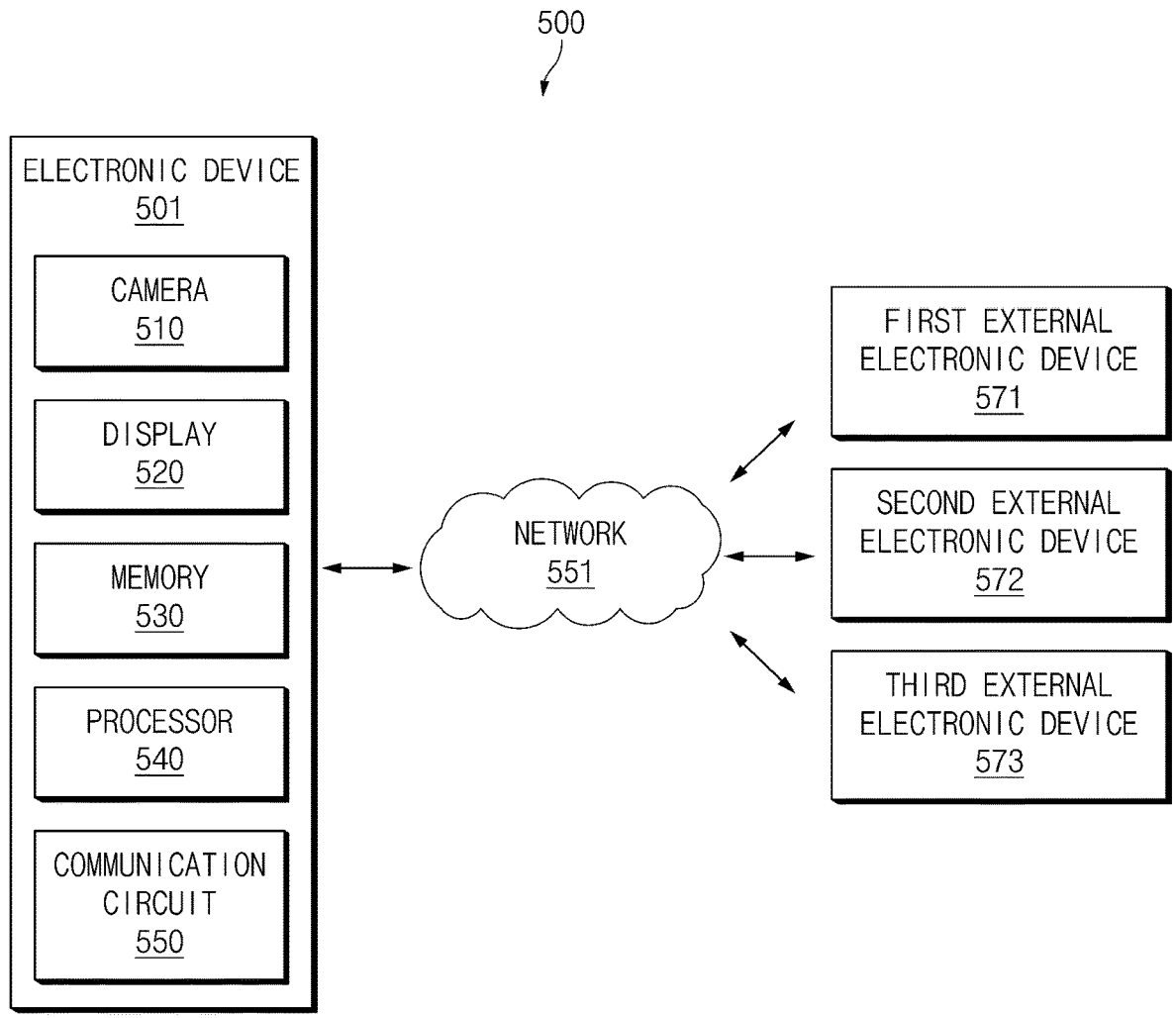
FIG. 5 is a block diagram of an electronic device according to an embodiment of the disclosure.

FIG. 5 is a block diagram of an electronic device according to an embodiment of the disclosure.

Referring to FIG. 5, in block diagram 500 an electronic device 501 (e.g., an electronic device 201 of FIG. 2) may include a camera 510 (e.g., a camera module 180 of FIG. 1), a display 520 (e.g., a display module 160 of FIG. 1), a memory 530 (e.g., a memory 130 of FIG. 1), a processor 540 (e.g., a processor 120 of FIG. 1), and a communication circuit 550. The processor 540 may be operatively connected to other components of the electronic device 501 and control various operations of the electronic device 501. The processor 540 may perform various operations of the electronic device 501 by executing one or more instructions stored in the memory 530. Hereinafter, operations described as being performed by the electronic device 501 may be referred to as being performed by the processor 540. The memory 530 may be operatively connected to at least the processor 540 and store instructions. The memory 530 may store various types of information. For example, the memory 530 may at least temporarily store an image and/or a video photographed by the camera 510. The memory 530 may at least temporarily store data received from a first external electronic device 571, a second external electronic device 572, and/or a third external electronic device 573.

The camera 510 of the electronic device 501 shown in FIG. 5 may correspond to the first camera of the electronic device 401 described with reference to FIG. 4. For the camera 510 of the electronic device 501, reference may be made to the above-described description of the first camera of the electronic device 401. The display 520 of the electronic device 501 shown in FIG. 5 may correspond to the display 420 of the electronic device 401 shown in FIG. 4. For the display 520 of the electronic device 501, reference may be made to the above description of the display 420 of the electronic device 401. The memory 530 of the electronic device 501 shown in FIG. 5 may correspond to the memory 430 of the electronic device 401 shown in FIG. 4. For the processor 540 of the electronic device 501, reference may be made to the above description of the processor 440 of the electronic device 401.

According to an embodiment, the electronic device 501 may include the communication circuit 550. The communication circuit 550 may support communication based on at least one communication protocol. For example, the communication circuit 550 may support short-range wireless communication (e.g., NFC, Bluetooth (e.g., Bluetooth™ legacy and/or Bluetooth™ low energy (BLE)), Wi-Fi, ultra-wideband (UWB) communication, and/or neighbor awareness networking (NAN) communication). For example, the communication circuit 550 may support long-range wireless communication (e.g., a cellular network and/or a wide area network (WAN)). The communication circuit 550 may include at least one antenna, at least one amplifier, at least one filter, at least one phase shifter, at least one switch, and/or at least one communication module to support at least one communication protocol.

According to an embodiment, the communication circuit 550 may communicate with an external electronic device (e.g., the first external electronic device 571, the second external electronic device 572, and/or the third external electronic device 573) through a network 551. Although shown as one network in FIG. 5, the embodiment is not limited thereto, and the electronic device 501 may communicate through different types of networks for each external electronic device.

According to an embodiment, the first external electronic device 571 may include a camera. According to an embodiment, the camera of the first external electronic device 571 may correspond to the second camera of the electronic device 401 described with reference to FIG. 4. That is, the electronic device 501 may perform a function corresponding to the second camera by using a separate external electronic device. For the camera of the first external electronic device 571, the above description of the second camera of the electronic device 401 may be referred to.

According to an embodiment, the electronic device 501 may be wearable on a part of the user's body. As described above with respect to the first camera and the second camera with reference to FIG. 4, when the electronic device 401 is worn by the user, the camera 510 may be set to obtain an image (e.g., a two-dimensional and/or three-dimensional image) in a direction (e.g., +x direction in FIG. 2) corresponding to the user's gaze. The first external electronic device 571 or the camera of the first external electronic device 571 may be set to obtain an image corresponding to a specified direction. The specified direction may include a direction different from a direction corresponding to the user's gaze. According to an embodiment, at least a part of the first external electronic device 571 or a photographing area of the camera of the first external electronic device 571 may include an area other than the photographing area of the first camera.

According to an embodiment, the processor 540 may receive a plurality of consecutive images obtained by the first external electronic device 571 from the first external electronic device 571 by using the communication circuit 550. For example, the processor 540 may receive a video from the first external electronic device 571 by using the communication circuit 550. The processor 540 may at least temporarily store the image and/or video received from the first external electronic device 571 in the memory 530.

According to an embodiment, the processor 540 may transmit a request to the first external electronic device 571 to obtain a plurality of consecutive images based on a user input received from the user of the electronic device 501. When receiving the request from the electronic device 501, the first external electronic device 571 may start to obtain an image by using a camera. According to an embodiment, the processor 540 may receive, in real time, a plurality of consecutive images obtained by the first external electronic device 571 from the first external electronic device 571 by using the communication circuit 550.

In the above-described embodiment, a case in which the processor 540 receives a plurality of consecutive images photographed by the first external electronic device 571 using a camera is exemplified, but the embodiment is not limited thereto. As another example, the first external electronic device 571 may include an output device capable of outputting (or reproducing) a plurality of consecutive images. According to various embodiments, the processor 540 may receive a plurality of consecutive images output (or reproduced) by the first external electronic device 571. For example, the processor 540 may receive a plurality of consecutive images output (or reproduced) by the first external electronic device 571 from the first external electronic device 571 in real time by using the communication circuit 550.

According to an embodiment, the processor 540 may obtain a plurality of consecutive images by using the first external electronic device 571. According to an embodiment, the processor 540 may associate at least one image extracted from the plurality of consecutive images obtained with a specific area on an external object identified from the image obtained using the camera 510, and may display at least one image associated with a specific area on the external object in augmented reality.

According to an embodiment, the processor 540 may identify an external object corresponding to the user's gaze or gaze direction from the image obtained by using the camera 510. Because the external object has been described above with reference to FIG. 4, the redundant description will be omitted or simplified. For the method of identifying an external object, at least one page included in the external object, and/or at least one content (e.g., a letter, a number, a figure, an image, or a table) included in the page by using the camera 510 by the processor 540, the description described above with reference to FIG. 4 may be referred to.

According to an embodiment, the processor 540 may extract at least one image to be associated with a specific area on an external object among a plurality of consecutive images received from the first external electronic device 571. For example, the at least one image may include a video clip generated by extracting at least a part of the video from the video received by the processor 540 from the first external electronic device 571.

According to an embodiment, the processor 540 may receive audio data (e.g., data obtained by recording ambient sound (outside the first external electronic device 571) at the time of photographing) obtained from the first external electronic device 571 when the first external electronic device 571 photographs a plurality of consecutive images, or audio data output (or reproduced) together with a plurality of consecutive images by the first external electronic device 571. According to an embodiment, the video received by the processor 540 from the first external electronic device 571 or the video clip generated by extracting at least a part of the video may include video and audio data corresponding to the plurality of consecutive images.

According to an embodiment, the processor 540 may extract at least one image to be associated with the external object from among a plurality of consecutive images based on a user input. The user input may include an input for specifying an area on an external object. Regarding the user input, reference may be made to the description described above with reference to FIG. 4. According to an embodiment, the user input may include a gesture input of a user.

According to an embodiment, the processor 540 may recognize the user's gesture by using the camera 510. The processor 540 may detect a user input for specifying an area on an external object by using the camera 510.

According to an embodiment, the processor 540 may extract at least one image obtained from a time point when a user input for specifying an area on an external object is input from a plurality of consecutive images obtained by using the first external electronic device 571. The processor 540 may extract at least one image corresponding to a section from an input time point of the user input to a predetermined end time from a plurality of consecutive images obtained by using the first external electronic device 571. For example, the processor 540 may generate a video clip by extracting a part of a video corresponding to a section from an input time point of a user input for specifying an area on an external object to a predetermined end time point from the video obtained by using the first external electronic device 571. Regarding the predetermined end time point, reference may be made to the description described above with reference to FIG. 4.

According to an embodiment, the processor 540 may detect a specific area on an external object corresponding to a user input by using the camera 510. The specific area on the external object corresponding to the user input may include at least a partial area in a page of the external object. The specific area may be an area corresponding to a specific content specified by a user input among at least one content included in the page of the external object.

According to various embodiments, the processor 540 may receive a user input for specifying an area on an external object using the third external electronic device 573. The third external electronic device 573 may be an electronic device that provides an electronic external object. For example, the electronic external object may be an electronic document or a screen of a device displaying the electronic document. The third external electronic device 573 may receive a user input for specifying an area on an external object from the user. For example, the third external electronic device 573 may receive a user input for specifying an area on an external object through a touch panel. The user input may include a part of the body of a user or a touch input using a stylus pen communicating with the third external electronic device 573. The third external electronic device 573 may transmit the user input received from the user to the electronic device 501 through the network 551. The electronic device 501 may detect a specific area on an external object corresponding to a user input based on the user input of specifying an area on an external object received from the third external electronic device 573.

According to an embodiment, the processor 540 may associate at least one image extracted from a plurality of consecutive images obtained using the first external electronic device 571 with a specific area on an external object corresponding to the user input. For example, the processor 540 may associate a video clip corresponding to at least a part of a video obtained using the first external electronic device 571 with a specific area on an external object specified by a user input. The video clip may correspond to a section from an input time point of a user input of specifying a specific area to a predetermined end time point.

According to an embodiment, the processor 540 may at least temporarily store at least one image associated with a specific area on an external object in the memory 530. According to an embodiment, the processor 540 may transmit at least one image associated with a specific area on an external object to the second external electronic device 572 by using the communication circuit 550. According to an embodiment, the second external electronic device 572 may be connected to the electronic device 501 through the network 551 and may include a server device including a database. For example, the second external electronic device 572 may be a cloud server. The second external electronic device 572 may store at least one image (e.g., a video clip) associated with a specific area on an external object and transmitted from the electronic device 501. According to an embodiment, the second external electronic device 572 may receive and store a plurality of consecutive images through the electronic device 501 or directly from the first external electronic device 571.

According to an embodiment, the processor 540 may associate at least one image extracted from a plurality of consecutive images obtained using the first external electronic device 571 with a specific area on an external object and may store the image together with metadata of the at least one image when storing the image. The metadata may be data associated with a virtual content for identifying or searching for the virtual content including the at least one image. According to an embodiment, the metadata may include at least one of information (e.g., timestamp) on a time point when the virtual content including the at least one image is generated, information (e.g., global positioning system, GPS) on a place where the virtual content is generated, or information obtained on the virtual content. For example, when the virtual content is a video clip obtained by recording a lecture, the processor 440 may store the video clip together with at least one of timestamp information when the video clip is generated, GPS information of the electronic device 401 when the video clip is generated, a lecturer, a teaching material used in the lecture, and/or other information obtained in relation to the lecture.

According to an embodiment, the information on a time point when the virtual content is generated may correspond to a time point when the processor 440 detects (or receives) a user input for associating the virtual content with an external object. A user input for associating the virtual content with a specific area on an external object by the processor 540 may be referred to as a user input for specifying a specific area on an external object.

According to an embodiment, the processor 440 may terminate acquisition of the image using the first external electronic device 571 based on the user input. For example, the processor 540 may transmit to the first external electronic device 571 a request for terminating acquisition of a plurality of consecutive images. When receiving the request from the electronic device 501, the first external electronic device 571 may terminate image acquisition. As another example, the processor 540 may stop receiving a plurality of consecutive images from the first external electronic device 571 based on a user input.

According to an embodiment, the processor 540 may identify a specific area on an external object from the image obtained by using the camera 510. The processor 540 may extract a feature point of an external object from the image, and identify the external object and/or a specific area on the external object based on the feature point.

According to an embodiment, the processor 540 may receive a user input corresponding to a specific area on an external object. According to an embodiment, the user input may include a user input for displaying (or playing) a virtual content associated with a specific area. Regarding the user input, reference may be made to the description described above with reference to FIG. 4. According to an embodiment, the processor 540 may display the virtual content associated with a specific area on an external object in augmented reality on the display 520 as the user input is received. The processor 540 may display the virtual content associated with a specific area on an external object corresponding to the user's gaze in an AR environment by displaying the virtual object on the display 520.

According to an embodiment, the processor 540 may determine a location to display the virtual content associated with a specific area on an external object, based on a user input. According to an embodiment, the processor 540 may edit the virtual content associated with a specific area on an external object based on a user input. According to an embodiment, the processor 540 may determine a reproduction format of the virtual content associated with a specific area on an external object, based on a user input. According to an embodiment, the processor 540 may delete the virtual content associated with a specific area on an external object based on a user input. According to an embodiment, the processor 540 may generate an index of at least one virtual content associated with an external object. According to an embodiment, the processor 540 may display an index list including index information of at least one virtual content associated with an external object on the display 520. According to an embodiment, the processor 540 may generate a bookmark corresponding to each page based on page information of at least one page including a specific area on an external object associated with each of at least one virtual content, and may display the bookmark on the display 520. Because the above-described operation of the processor 540 has been described above with reference to FIG. 4, the redundant description thereof will be omitted.

Hereinafter, an operation in which an electronic device according to an embodiment associates a specific area on an external object with virtual content and reproduces the virtual content associated with the specific area will be described with reference to FIGS. 6A and 6B.

Figure 6A:
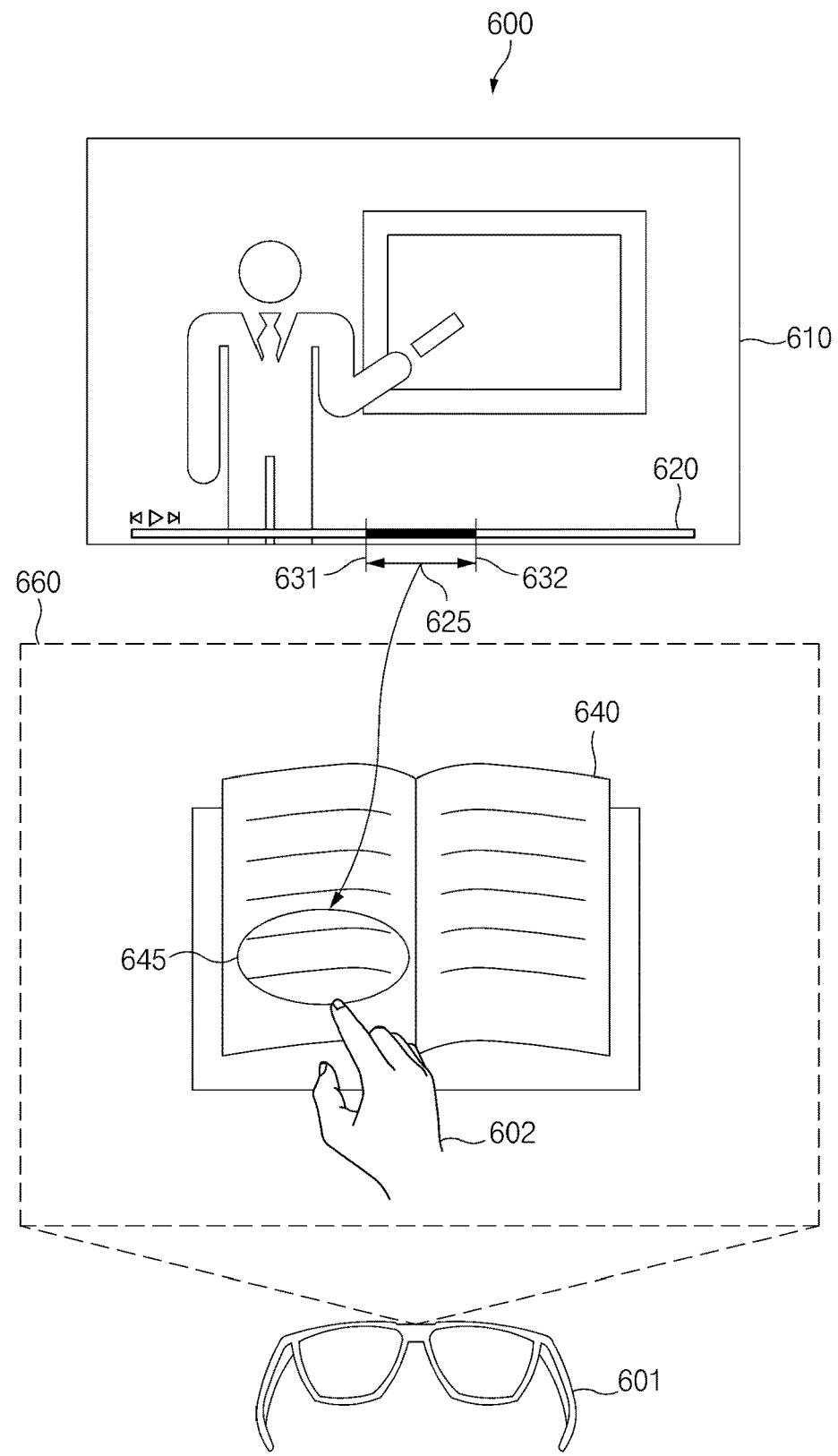
FIG. 6A is a diagram illustrating an operation in which an electronic device associates a specific area on an external object with virtual content, according to an embodiment of the disclosure.

FIG. 6A is a diagram illustrating an operation in which an electronic device associates a specific area on an external object with virtual content, according to an embodiment of the disclosure.

Figure 6B:
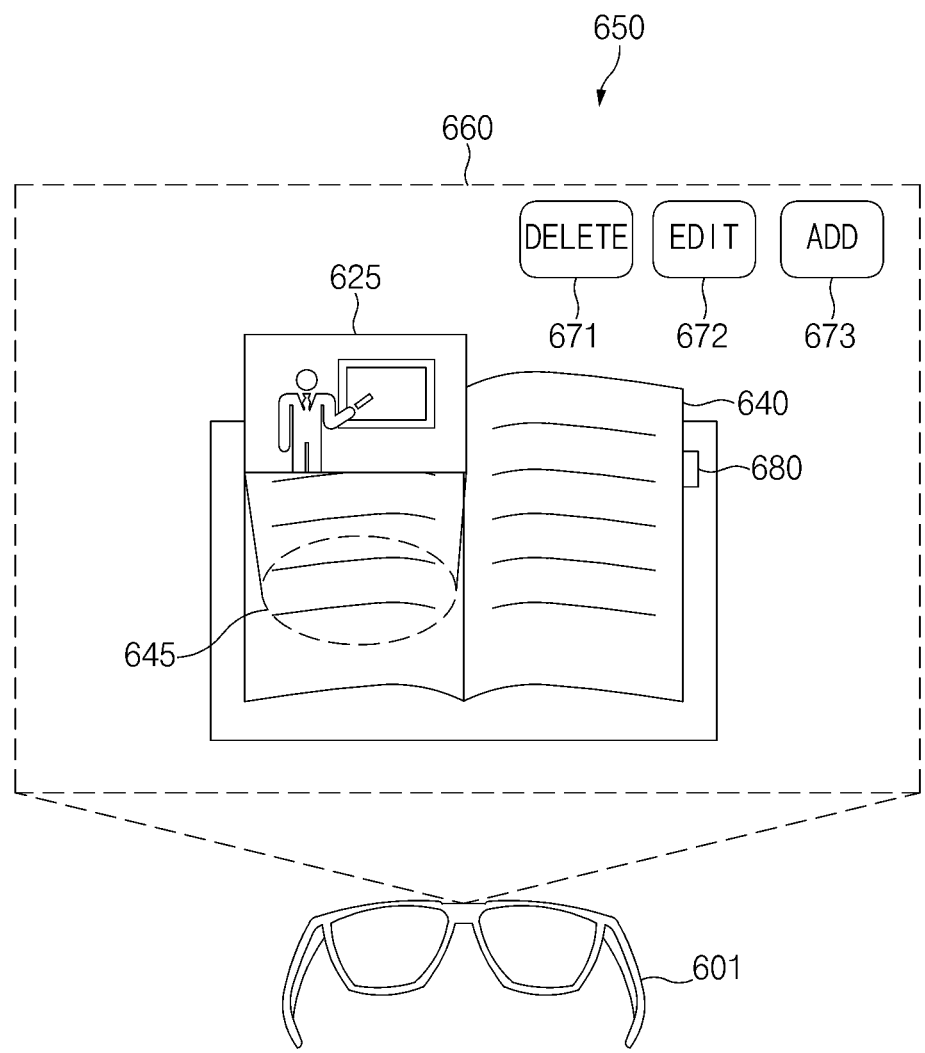
FIG. 6B is a diagram illustrating an operation in which an electronic device reproduces virtual content associated with a specific area on an external object according to an embodiment of the disclosure.

FIG. 6B is a diagram illustrating an operation in which an electronic device reproduces virtual content associated with a specific area on an external object according to an embodiment of the disclosure.

Operations of an electronic device 601 (e.g., the electronic device 401 of FIG. 4 or the electronic device 501 of FIG. 5) described below may be performed by a processor (e.g., the processor 440 of FIG. 4 or the processor 540 of FIG. 5) of the electronic device 601.

Referring to FIGS. 6A and 6B, in diagram 600 and diagram 650, a field of view 660 may correspond to a field of view of a user of the electronic device 601. According to an embodiment, the field of view 660 may be an area viewed by the user through a display (e.g., the display 420 of FIG. 4 or the display 520 of FIG. 5) of the electronic device 601. According to an embodiment, the field of view 660 may correspond to at least a part of a photographing area of a first camera (e.g., the first camera described with reference to FIG. 4, or the camera 510 of FIG. 5) of the electronic device 601 set to obtain an image corresponding to a direction corresponding to the user's gaze.

Referring to FIG. 6A, the electronic device 601 may identify an external object 640 corresponding to the direction corresponding to a user's gaze by using a first camera. According to an embodiment, the electronic device 601 may obtain an image corresponding to a direction corresponding to the user's gaze by using the first camera, and extract a feature point from the obtained image. According to an embodiment, the electronic device 601 may identify the external object 640 based on the extracted feature point. In the embodiment with reference to FIGS. 6A and 6B, the external object 640 may be a book that is a real object.

According to an embodiment, the electronic device 601 may detect a user input of specifying a specific area 645 on the external object 640 using a hand 602 by using the first camera. According to an embodiment, the user input may include a gesture input using a user's finger. Referring to FIG. 6A, for example, the electronic device 601 may detect a gesture of drawing a closed curve including the specific area 645 to which the user wants to point by using a fingertip, but the embodiment is not limited thereto. As another example, the electronic device 601 may detect a gesture pointing to the specific area 645 to which the user wants to point by using a fingertip.

According to an embodiment, the electronic device 601 may identify the specific area 645 on the external object 640 specified by a user input using the first camera. According to an embodiment, the electronic device 601 may obtain an image of the external object 640 by using the first camera, and extract a feature point from the acquired image of the external object 640. According to an embodiment, the electronic device 601 may identify at least one of a page number of at least one page included in the image of the external object 640 and/or at least one content (e.g., a letter, a number, a figure, an image, or a table) included in the page. For example, the electronic device 601 may identify a page number of a page including the specific area 645 on the external object 640 specified by a user input, and may identify content corresponding to the specific area 645. The electronic device 601 may identify the specific area 645 on the external object 640 specified by a user input based on a page number of a page including the specific area 645 and content corresponding to the specific area 645.

According to an embodiment, the electronic device 601 may use content (e.g., a graph, a picture, an image, or a keyword) corresponding to the specific area 645 as a marker, or may use a specified virtual object as a marker. According to an embodiment, the marker may be referred to as a medium for augmenting virtual content associated with the specific area 645. The content corresponding to the specific area 645 may be, for example, content printed on the external object 640 or content drawn by a user using an actual pen. According to an embodiment, the electronic device 601 may map a specified virtual object to the specific area 645 by associating the specific area 645 with the virtual content. The electronic device 601 may display a specified virtual object mapped to the specific area 645 in augmented reality on a display.

According to an embodiment, the electronic device 601 may associate virtual content with the identified specific area 645. The virtual content associated with the specific area 645 may include at least one image extracted from a plurality of consecutive images obtained by the electronic device 601 using a second camera (e.g., the second camera of FIG. 4), or an external electronic device (e.g., the first external electronic device 571 of FIG. 5). According to an embodiment, the plurality of consecutive images may correspond to a video, and at least one image extracted from the plurality of consecutive images may correspond to at least a part of the video. According to an embodiment, the electronic device 601 may map a video clip 625 extracted from a video 610 obtained using the second camera or external electronic device to a specific area on the external object 640 specified by a user input.

According to an embodiment, the electronic device 601 may obtain an image corresponding to a specified direction regardless of a user's gaze by using the second camera or an external electronic device. According to an embodiment, the photographing area of the second camera or the external electronic device may not be affected by the user's gaze change. Differently, the photographing area of the first camera may be changed as the user's gaze changes. For example, in a situation in which a lecturer is giving a lecture in a lecture room while standing in the front direction of the user and the user is alternately looking at a book placed on a desk and the lecturer, the electronic device 601 may use the first camera to obtain an image corresponding to the user's moving gaze direction, or use a second camera or an external electronic device to obtain an image corresponding to a direction fixed in the front direction of the user. As another example, in the above-described situation, the electronic device 601 may obtain an image corresponding to a direction corresponding to the location of the lecturer by using the second camera or the external electronic device.

In FIG. 6A, the electronic device 601 may obtain the video 610 by obtaining a plurality of consecutive images by using a second camera or an external electronic device based on a user input. According to an embodiment of the disclosure, the electronic device 601 may extract a part of an entire section 620 of the video 610 based on an input for specifying the specific area 645 on the external object 640 input while photographing the video 610 in order to generate the video clip 625. According to an embodiment, the video clip 625 may correspond to a section from a first point 631 to a second point 632 among the entire section 620 of the video 610.

According to an embodiment, the first point 631 may correspond to an input time point of a first user input for specifying the specific area 645 on the external object 640.

According to an embodiment, the second point 632 may correspond to a predetermined end time point in relation to the extraction of the video clip 625. For example, the second point 632 may be a point corresponding to a time point after a specified time has elapsed from a time point corresponding to the first point 631. As another example, the second point 632 may be a point corresponding to the input time point of a second user input that is input after the input time point of the first user input. According to an embodiment, the second user input may include at least one of a voice input, a gesture input, and/or a gaze trajectory for determining an end time point of the video clip 625 to be associated with the specific area 645. For example, the second user input may include a user utterance saying "end", a gesture for specifying an area different from the specific area 645 specified by the first user input among areas on the external object 640, and a trajectory of the gaze moving from the specific area 645 specified by the first user input to an area different from the specific area 645 among areas on the external object 640.

According to an embodiment, the electronic device 601 may store time point information corresponding to the first point 631. The time point information may be, for example, a timestamp. According to an embodiment, the time point information corresponding to the first point 631 may include a timestamp of a time point when the electronic device 601 detects or receives a user input for specifying the specific area 645 on the external object 640.

According to an embodiment, the electronic device 601 may store the video clip 625 associated with the specific area 645 and information about a time point when a user input for specifying the specific area 645 is detected or received together. According to an embodiment, the electronic device 601 may store the video clip 625 associated with the specific area 645 and metadata of the video clip 625 together. For example, the metadata of the video clip 625 may include lecture time (time stamp information), a lecturer, a lecture location (GPS location information), or data related to the lecture such as teaching materials used in the lecture.

In FIG. 6B, the electronic device 601 may be in a state after obtaining the video 610 by using the second camera or the external electronic device. Referring to FIG. 6B, when receiving a user input corresponding to the specific area 645 on the external object 640, the electronic device 601 may play the video clip 625 associated with the specific area 645. According to an embodiment, the electronic device 601 may display the video clip 625 in augmented reality.

According to an embodiment, the electronic device 601 may recognize a user's gesture of pointing to the specific area 645 by using the first camera. The user's gesture of pointing to the specific area 645 may include a user's gesture of pointing to a real object (e.g., a graph printed on the external object 640 or a figure of a specified shape drawn by the user using an actual pen) used as a marker, or a virtual object (e.g., a specified icon). When receiving a user's gesture input of pointing to the specific area 645, the electronic device 601 may display the video clip 625 associated with the specific area 645 in augmented reality on a display.

According to various embodiments, the electronic device 601 may identify the specific area 645 on the external object 640 that the user is looking at by using an eye-tracking sensor (e.g., the first eye-tracking sensor 276-1 and the second eye-tracking sensor 276-2 of FIG. 2). For example, the user may utter a specified keyword while looking at the specific area 645. For example, as the electronic device 601 receives the user's utterance by using the microphone, the electronic device 601 may display the video clip 625 associated with the specific area 645 corresponding to the user's gaze in augmented reality on the display.

According to an embodiment, the electronic device 601 may play the video clip 625 associated with the specific area 645 in a specified playback area. According to an embodiment, the electronic device 601 may search for or extract and play the video clip 625 stored in a memory (e.g., the memory 430 of FIG. 4 or the memory 530 of FIG. 5) or an external electronic device (e.g., the second external electronic device 572) based on the metadata of the video clip 625.

According to an embodiment, the electronic device 601 may display a first object 671 to which the operation of deleting the association between the specific area 645 and the video clip 625 is mapped. For example, the first object 671 may be a button including text "Delete". The electronic device 601 may delete the association between the specific area 645 and the video clip 625 based on a user input for selecting the first object 671. According to an embodiment, the electronic device 601 may delete the video clip 625 associated with the specific area 645 from the memory based on the user input for selecting the first object 671.

According to an embodiment, the electronic device 601 may display a second object 672 to which an operation of displaying a user interface for editing the video clip 625 associated with the specific area 645 is mapped. For example, the second object 672 may be a button including text "Edit". The electronic device 601 may display a user interface for editing the video clip 625 based on the user input for selecting the second object 672. A user interface for editing the video clip 625 will be described below with reference to FIGS. 12 and 13.

According to an embodiment, the electronic device 601 may display a third object 673 to which an operation of displaying a user interface for adding a virtual object to the video clip 625 associated with the specific area 645 is mapped. For example, the third object 673 may be a button including text "Addition". The electronic device 601 may display a user interface for adding a virtual object to the video clip 625 based on a user input for selecting the third object 673. For example, the user may add at least one of a memo, an icon, and/or an animation effect to the video clip 625 through the user interface. The electronic device 601 may display the added memo, icon, and animation effect together with the video clip 625.

According to an embodiment, the electronic device 601 may display a bookmark 680. According to an embodiment, the electronic device 601 may generate and display the bookmark 680 corresponding to a page based on page information of the page including the specific area 645 on the external object 640 associated with the video clip 625. According to an embodiment, the bookmark 680 may include page number information of a page including the specific area 645 on the external object 640 associated with the video clip 625. For example, the electronic device 601 may display at least one of a page number of a page corresponding to the bookmark 680 and/or information (e.g., metadata of a video clip or a preview image of a video clip) associated with the video clip 625 mapped to a page corresponding to the bookmark 680 based on a user input for selecting the bookmark 680.

Hereinafter, an operation of obtaining a virtual content by an electronic device according to an embodiment will be described with reference to FIGS. 7A, 7B, and 8.

Figure 7A:
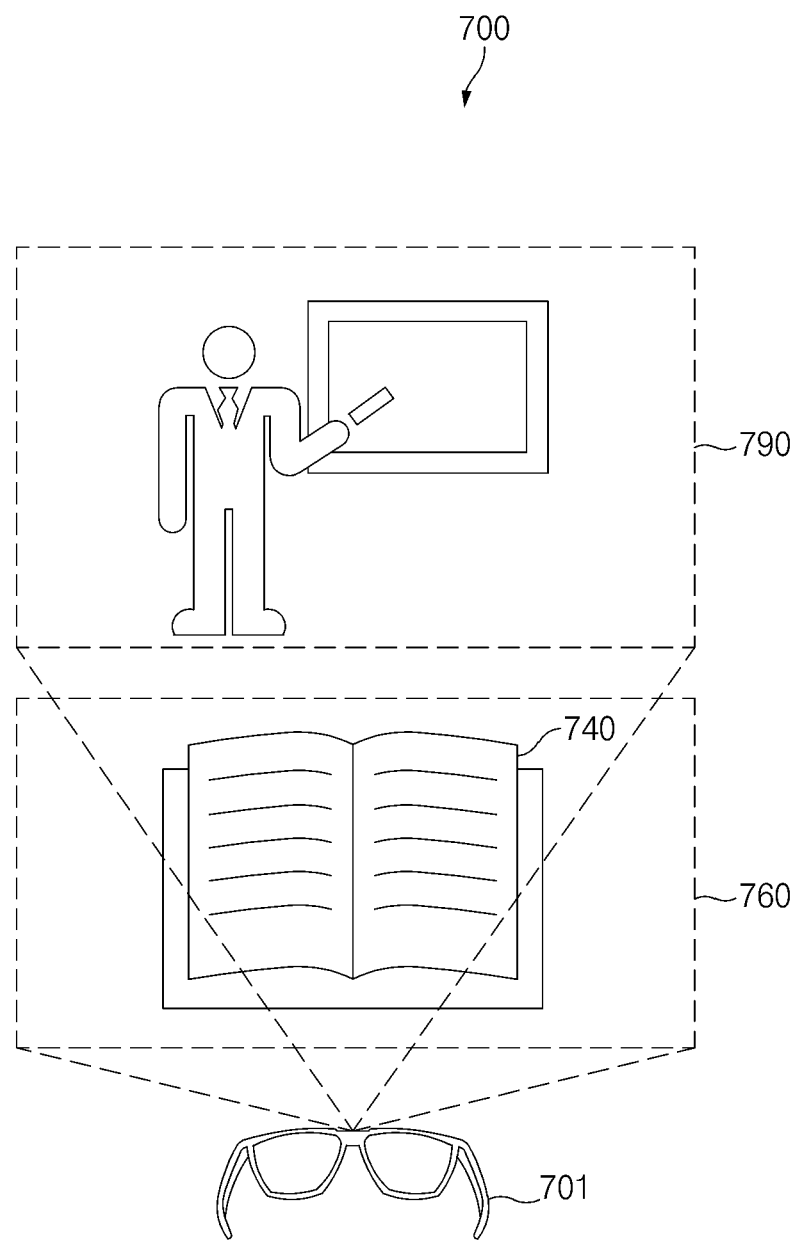
FIG. 7A is a diagram illustrating an operation of obtaining virtual content by an electronic device according to an embodiment of the disclosure.

FIG. 7A is a diagram illustrating an operation of obtaining a virtual content by an electronic device according to an embodiment of the disclosure.

Figure 7B:
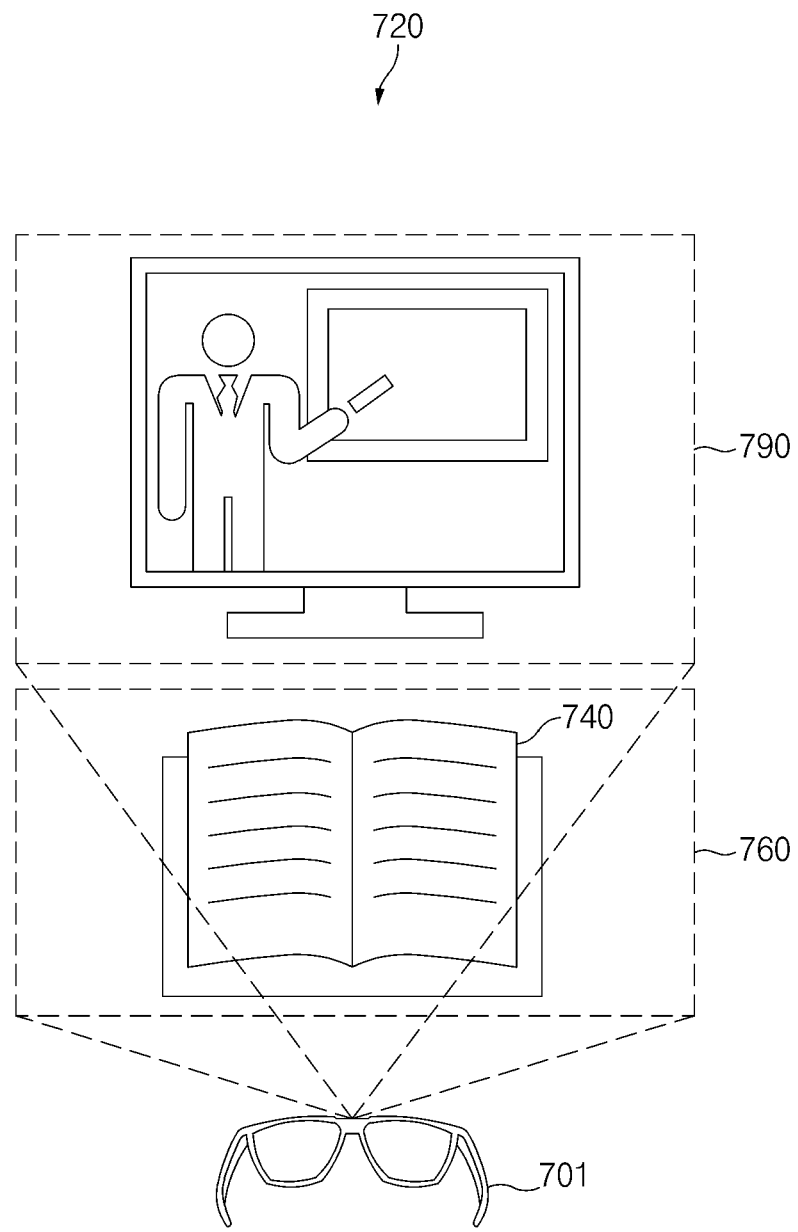
FIG. 7B is a diagram illustrating an operation of obtaining virtual content by an electronic device according to an embodiment of the disclosure.

FIG. 7B is a diagram illustrating an operation of obtaining a virtual content by an electronic device according to an embodiment of the disclosure. Operations of an electronic device (e.g., the electronic device 401 of FIG. 4) described below may be performed by a processor (e.g., the processor 440 of FIG. 4) of the electronic device.

Referring to FIGS. 7A and 7B, in diagram 700 and diagram 720, a first field of view 760 may correspond to a field of view of a user of an electronic device 701. According to an embodiment, the first field of view 760 may be an area shown to a user through a display (e.g., the display 420 of FIG. 4) of the electronic device 701. According to an embodiment, the first field of view 760 may correspond to at least a part of a photographing area of a first camera (e.g., the first camera described above with reference to FIG. 4) of the electronic device 701 set to obtain an image corresponding to a direction corresponding to the user's gaze.

According to an embodiment, a second field of view 790 may correspond to the field of view of a second camera (e.g., the second camera described above with reference to FIG. 4) of the electronic device 701. According to an embodiment, the second camera may be set to obtain an image corresponding to a specified direction regardless of the user's gaze. According to an embodiment, the photographing area of the second camera may not be affected by the user's gaze change. Alternatively, the photographing area of the first camera may be changed as the user's gaze changes.

Referring to FIG. 7A, for example, a user may take an offline lecture while wearing the electronic device 701. The user may alternately see a lecturer who gives a lecture while standing in the front direction of the user and a book 740 placed on a desk.

Referring to FIG. 7B, for example, a user may take an online lecture while wearing the electronic device 701. The user may alternately see the display of the external electronic device positioned in the front direction of the user and the book 740 placed on the desk. According to an embodiment, the electronic device 701 may obtain an image corresponding to the user's moving gaze direction using the first camera, and may use the second camera to obtain an image corresponding to the position of the lecturer or the position of the display. For example, at the moment the user is looking at the book 740, the electronic device 701 may obtain an image corresponding to the book 740 by using the first camera, and by using the second camera, may obtain an image in a direction corresponding to the lecturer's location or the location of the display.

According to an embodiment, the electronic device 701 may obtain a plurality of consecutive images by using the second camera. For example, the plurality of consecutive images obtained by the electronic device 701 using the second camera may be an offline lecture or a video recorded by a user taking an online lecture while wearing the electronic device 701.

According to an embodiment, the electronic device 701 may generate a video clip (e.g., the video clip 625 of FIGS. 6A and 6B) by extracting at least a part of a video obtained by using the second camera, and the generated video clip may be associated with the book 740. The book 740 is an example of an external object disclosed in this document, and may correspond to the external object 640 of FIGS. 6A and 6B. For a method in which the electronic device 701 generates a video clip and associates it with the book 740, reference may be made to the description with reference to FIGS. 6A and 6B.

In the above-described embodiment, the case where the electronic device 701 generates a video clip from a video corresponding to a direction corresponding to a display of an external electronic device that is playing an online lecture is exemplified, but the disclosure is not limited thereto. The electronic device 701 may generate a video clip based on an online lecture file or a video recorded on a reproduction screen of an online lecture displayed through a display of an external electronic device.

Figure 8:
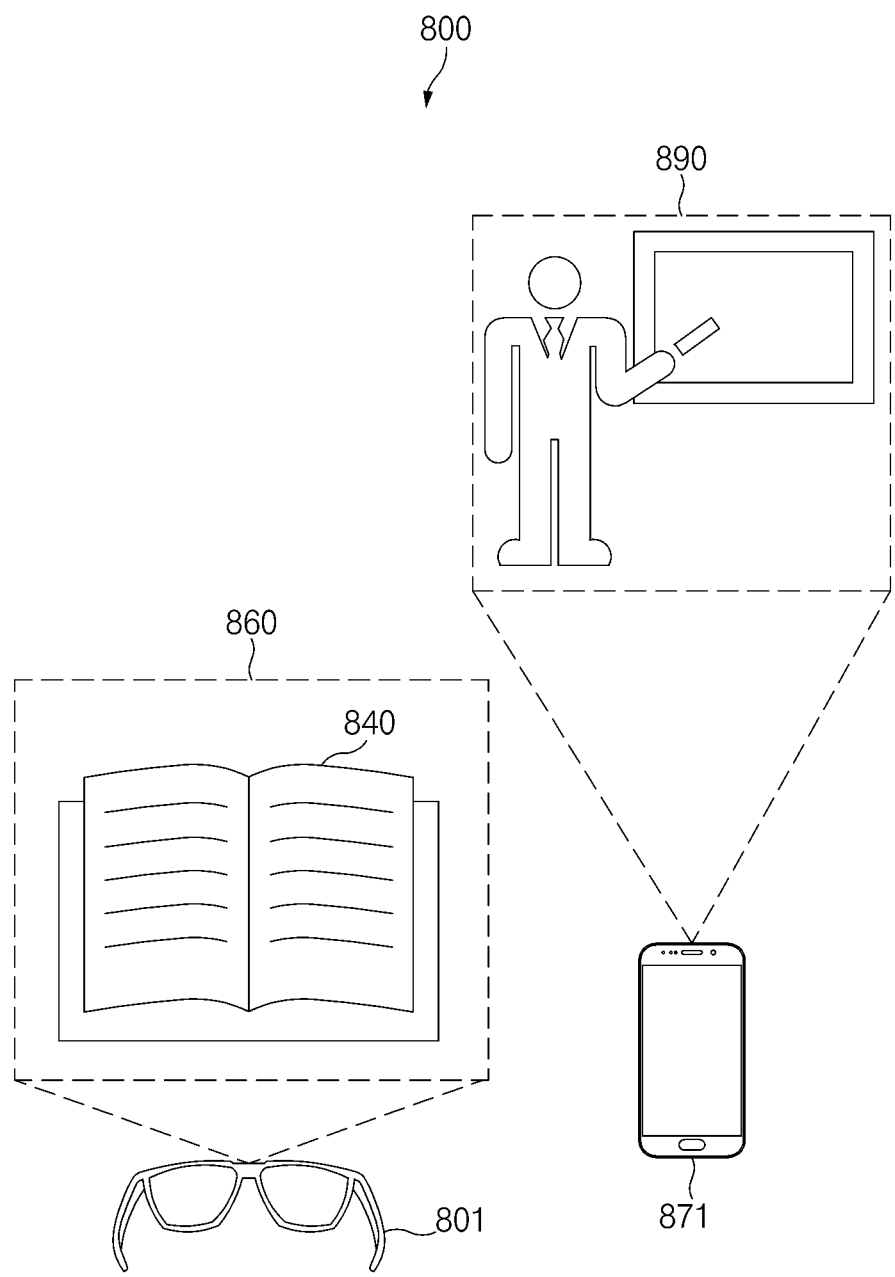
FIG. 8 is a diagram illustrating an operation of obtaining virtual content by an electronic device according to an embodiment of the disclosure.

FIG. 8 is a diagram 800 illustrating an operation of obtaining virtual content by an electronic device according to an embodiment of the disclosure.

Operations of an electronic device (e.g., the electronic device 501 of FIG. 5) described below may be performed by a processor (e.g., the processor 540 of FIG. 5) of the electronic device.

Referring to FIG. 8, in diagram 800 a first field of view 860 may correspond to a field of view of a user of an electronic device 801. According to an embodiment, the first field of view 860 may be an area viewed by a user through a display (e.g., the display 520 of FIG. 5) of the electronic device 801. According to an embodiment, the first field of view 860 may correspond to at least a part of a photographing area of a camera (e.g., the camera 510 of FIG. 5) of the electronic device 801 set to obtain an image corresponding to a direction corresponding to the user's gaze.

According to an embodiment, a second field of view 890 may correspond to the field of view of an external electronic device 871 (e.g., the first external electronic device 571 of FIG. 5) of the electronic device 801. According to an embodiment, the external electronic device 871 may be a camera device capable of communicating with the electronic device 801. According to an embodiment, the external electronic device 871 may be set to obtain an image corresponding to a specified direction regardless of a user's gaze. According to an embodiment, the photographing area of the external electronic device 871 may not be affected by the user's gaze change. Alternatively, the photographing area of the camera of the electronic device 801 may change as the user's gaze changes.

Referring to FIG. 8, for example, a user may take an offline lecture while wearing the electronic device 801. The user may alternately view the lecturer who is standing in a position facing the user and a book 840 placed on a desk. According to an embodiment, the electronic device 801 may obtain an image corresponding to a user's moving gaze direction by using a camera, and may use the external electronic device 871 to obtain an image correspond to the direction corresponding to the location of the lecturer. For example, at the moment the user is looking at the book 840, the electronic device 801 may obtain an image corresponding to the book 840 by using the camera, and may obtain an image corresponding to a direction corresponding to the location of the lecturer by using the external electronic device 871.

According to an embodiment, the electronic device 801 may obtain a plurality of consecutive images by using the external electronic device 871. The electronic device 801 may receive the plurality of consecutive images obtained by the external electronic device 871 by using a communication circuit (e.g., the communication circuit 550 of FIG. 5). For example, the plurality of consecutive images obtained by the electronic device 701 using the external electronic device 871 may be a video obtained by recording an offline lecture while a user wears the electronic device 801.

According to an embodiment, the electronic device 801 may extract at least a part of a video obtained by using the external electronic device 871 to generate a video clip (e.g., the video clip 625 of FIGS. 6A and 6B), and may associate the generated video clip with the book 840. As an example of an external object disclosed in the disclosure, the book 840 may correspond to the external object 640 of FIGS. 6A and 6B. For the method of associating a video clip with the book 740 by the electronic device 801, reference may be made to the description with reference to FIGS. 6A and 6B.

In the above-described embodiment, the case in which the electronic device 801 generates a video clip from a video of an offline lecture recorded by the electronic device 801 has been exemplified, but the embodiment is not limited thereto. As another example, the electronic device 801 may generate a video clip from a video obtained by recording an online lecture, and the description with reference to FIG. 7B may be referred to in this regard.

Hereinafter, examples of various user inputs for associating virtual content with a specific area on an external object by an electronic device according to an embodiment will be described with reference to FIGS. 9A to 9D.

FIGS. 9A to 9D are diagrams illustrating various user inputs for associating virtual content with a specific area on an external object by an electronic device according to various embodiments of the disclosure. Operations of an electronic device 901 (e.g., the electronic device 401 of FIG. 4 or the electronic device 501 of FIG. 5) described below may be performed by a processor of the electronic device 901 (e.g., the processor 440 of FIG. 4 or the processor 540 of FIG. 5).

A field of view 960 illustrated in FIGS. 9A to 9D may correspond to a field of view of a user of an electronic device according to an embodiment. According to an embodiment, the field of view 960 may be an area viewed by a user through a display (e.g., the display 420 of FIG. 4 or the display 520 of FIG. 5) of the electronic device. According to an embodiment, the field of view 960 may correspond to at least a portion of a photographing area of a camera (e.g., the first camera described above with reference to FIG. 4 or the camera 510 of FIG. 5) of an electronic device set to obtain an image corresponding to a direction corresponding to the user's gaze.

According to an embodiment, the electronic device may identify a book 940 from an image obtained by using a camera. Hereinafter, the book 940 may correspond to an external object disclosed in the disclosure.

Figure 9A:
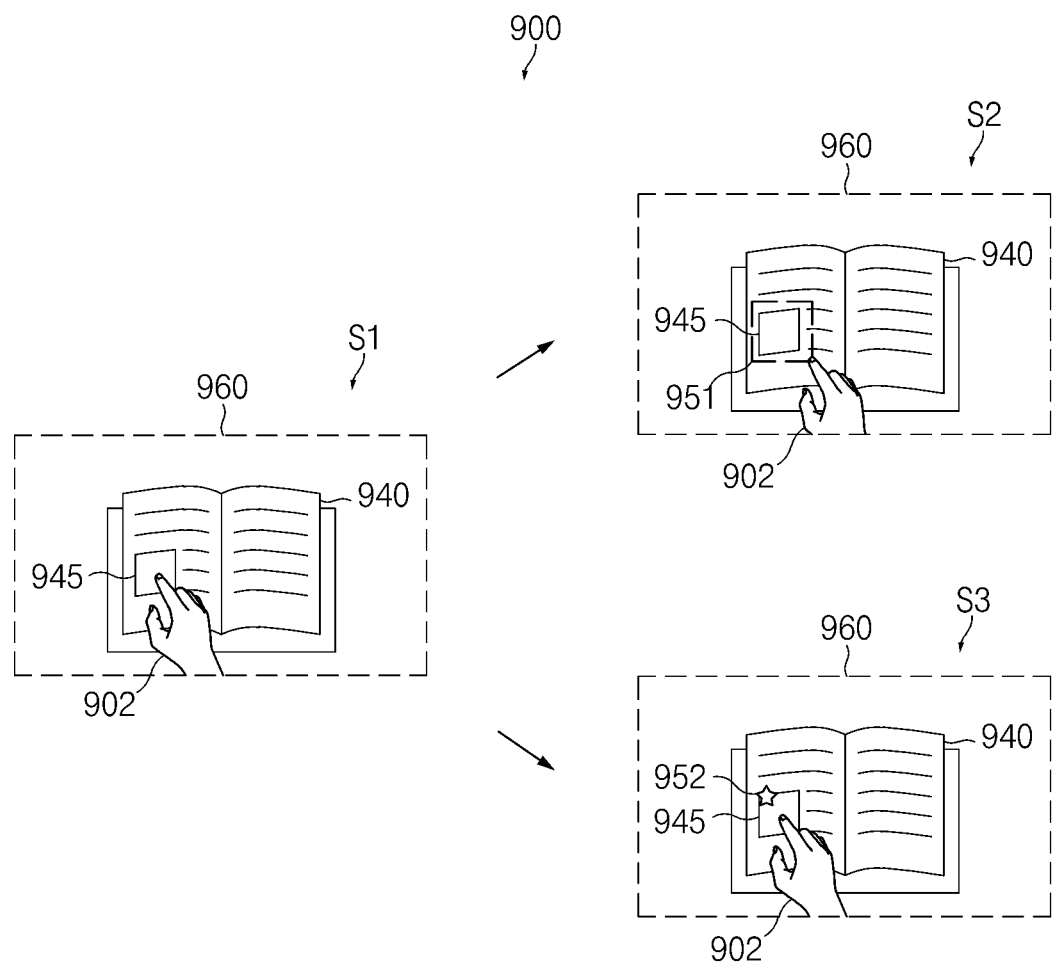
FIGS. 9A, 9B, 9C, and 9D are diagrams illustrating various user inputs for associating virtual content with a specific area on an external object by an electronic device according to various embodiments of the disclosure.

FIG. 9A is a diagram illustrating an example of a user input for associating virtual content with a specific area on an external object by an electronic device according to an embodiment of the disclosure.

Referring to FIG. 9A, in diagram 900 in a first state S1, a user may point to a specific area 945 on a book 940 by using a hand 902. The electronic device may recognize a gesture of a user that points to the specific area 945 by using the hand 902 by using the camera. For example, the electronic device may identify a page number of a page including the specific area 945 and a content corresponding to the specific area 945 among at least one content included in the page based on the position of the gesture. For example, the content corresponding to the specific area 945 may include at least one of a graph, a table, and/or an image. The electronic device may identify the specific area 945 based on a page number of a page including the specific area 945 and the content corresponding to the specific area 945. As the electronic device identifies the specific area 945 in the first state S1, the electronic device may associate the specific area 945 with the virtual content. The electronic device may change to a second state S2 or a third state S3 by associating the specific area 945 with the virtual content.

In the second state S2 or the third state S3, the electronic device may map a specified virtual object to the specific area 945. The electronic device may display the specified virtual object mapped to the specific area 945 in augmented reality on a display. For example, in the second state S2, the electronic device may map a first object 951 to the specific area 945. The first object 951, which is a virtual object, may be a guide line indicating an area. The electronic device may display the first object 951 on the display by allowing the first object 951 to overlap the specific area 945.

As another example, in the third state S3, the electronic device may map a second object 952 to the specific area 945. The second object 952 may be an icon of a specific shape as a virtual object. The electronic device may display the second object 952 on the display by allowing the second object 952 to overlap the specific area 945.

According to an embodiment, the electronic device may adjust or change at least one of the location, size, and/or shape of the first object 951 or the second object 952 based on a user input.

According to an embodiment, the electronic device may use a specified virtual object mapped to the specific area 945 as a marker based on a user input. For example, the electronic device may use the first object 951 or the second object 952 as a marker.

Figure 9B:
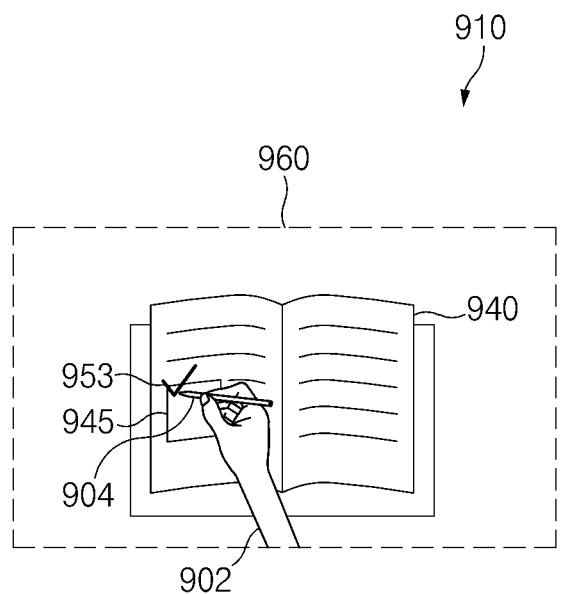

FIG. 9B is a diagram illustrating an example of a user input for associating a virtual content with a specific area on an external object by an electronic device according to an embodiment of the disclosure.

Referring to FIG. 9B, in diagram 910 a user may draw a specified shape in an area on the book 940 with a pen 904 using the hand 902. In the embodiment, the pen 904 is taken as an example, but the embodiment is not limited thereto, and the following description may be equally applied even when the user uses another writing instrument such as a pencil. For example, the writing instrument may be referred to as a real object capable of forming a shape on the page of the book 940. According to an embodiment, the electronic device may recognize a gesture using the hand 902 of a user by using a camera. For example, the electronic device may identify a third object 953 formed by a user using the pen 904 based on the location of the gesture.

According to an embodiment, the electronic device may identify a page number of a page including the third object 953 by using a camera. According to an embodiment, the electronic device may identify an area on the book 940 corresponding to the third object 953 as the specific area 945. According to an embodiment, the specific area 945 may include an area adjacent to the third object 953 and/or an area overlapping the third object 953. As the electronic device identifies the specific area 945, the electronic device may associate the specific area 945 with virtual content.

According to an embodiment, the electronic device may use content corresponding to the specific area 945 as a marker. For example, the electronic device may use the third object 953 as a marker. The third object 953, which is a real object, may be the content (e.g., a figure or a character) drawn on the book 940 by the user using the pen 904.

Figure 9C:
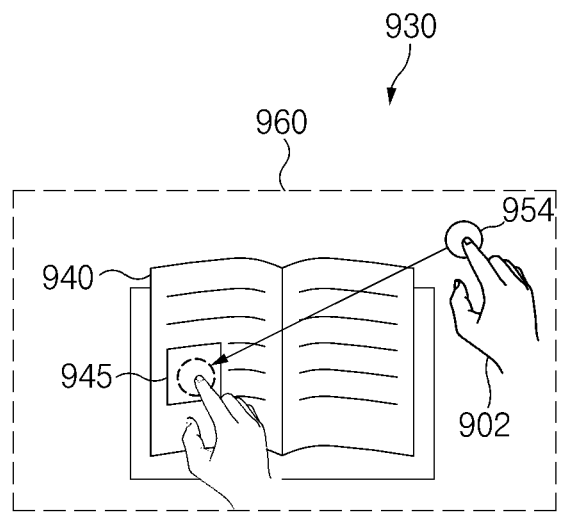

FIG. 9C is a diagram illustrating an example of a user input for associating virtual content with a specific area on an external object by an electronic device according to an embodiment of the disclosure.

Referring to FIG. 9C, in diagram 930 an electronic device may display a fourth object 954 on one area of a display. According to an embodiment, the fourth object 954 may be a user interface that the electronic device displays in augmented reality to generate a marker. The electronic device may specify the specific area 945 on the book 940 based on a user input for the fourth object 954. For example, the user may drag the fourth object 954 by using the hand 902 and drop it on a location corresponding to the specific area 945 on the book 940. The electronic device may recognize a gesture of dragging and dropping the fourth object 954 by using a camera. In the embodiment, the case where the electronic device recognizes the drag and drop gesture with respect to the fourth object 954 is taken as an example, but the embodiment is not limited thereto. The electronic device may use the fourth object 954 to receive various user inputs that specify the specific area 945 on the book 940.

According to an embodiment, as the electronic device receives a user's gesture input for dragging and dropping the fourth object 954, the electronic device may move the fourth object 954 or an object (e.g., an object from which the fourth object 954 is copied) derived from the fourth object 954 to a location corresponding to the specific area 945. According to an embodiment, the electronic device may identify the area on the book 940 in which the fourth object 954 or the object derived from the fourth object 954 is dropped as the specific area 945 based on the position of the gesture. As the electronic device identifies the specific area 945, the electronic device may associate the specific area 945 with the virtual content.

According to an embodiment, the electronic device may map a specified virtual object to the specific area 945 based on a user input. The electronic device may use the specified virtual object mapped to the specific area 945 as a marker. For example, the electronic device may map the object derived from the fourth object 954 or the fourth object 954 to the specific area 945 to which the fourth object 954 or the object derived from the fourth object 954 is dropped. The electronic device may use the fourth object 954 or the object derived from the fourth object 954 mapped to the specific area 945 as a marker.

Figure 9D:
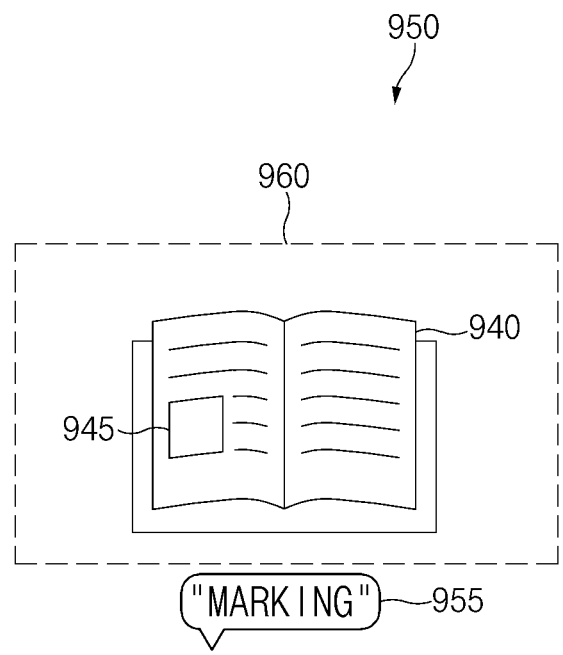

FIG. 9D is a diagram illustrating an example of a user input for associating virtual content with a specific area on an external object by an electronic device according to an embodiment of the disclosure.

Referring to FIG. 9D, in diagram 950 an electronic device may use an eye-tracking sensor (e.g., the first eye-tracking sensor 276-1 and the second eye-tracking sensor 276-2 of FIG. 2) to identify the area on the book 940 at which a user looks. For example, the electronic device may identify the specific area 945 that the user gazes at by using the eye-tracking sensor.

According to an embodiment, the electronic device may receive a user utterance 955 including a specified keyword. The electronic device may perform an operation mapped to a specific keyword by identifying the specified keyword from the received user's utterance. For example, the specified keyword may include "marking", and an operation of associating virtual content with the specific area 945 corresponding to the user's gaze area may be mapped to "marking". According to an embodiment, as the electronic device receives the user utterance 955, the electronic device may associate the virtual content with the specific area 945 on the book 940 that the user looks at and is identified when receiving the user utterance 955.

According to an embodiment, the electronic device may use content corresponding to the specific area 945 as a marker. For example, the content corresponding to the specific area 945 may include content printed on the book 940 or content drawn by a user using an actual pen. For example, the content corresponding to the specific area 945 may include a table, an image, a picture, a graph, or a keyword.

Hereinafter, with reference to FIG. 10, an operation of associating an external object in an electronic form with virtual content by an electronic device according to an embodiment will be described.

Figure 10:
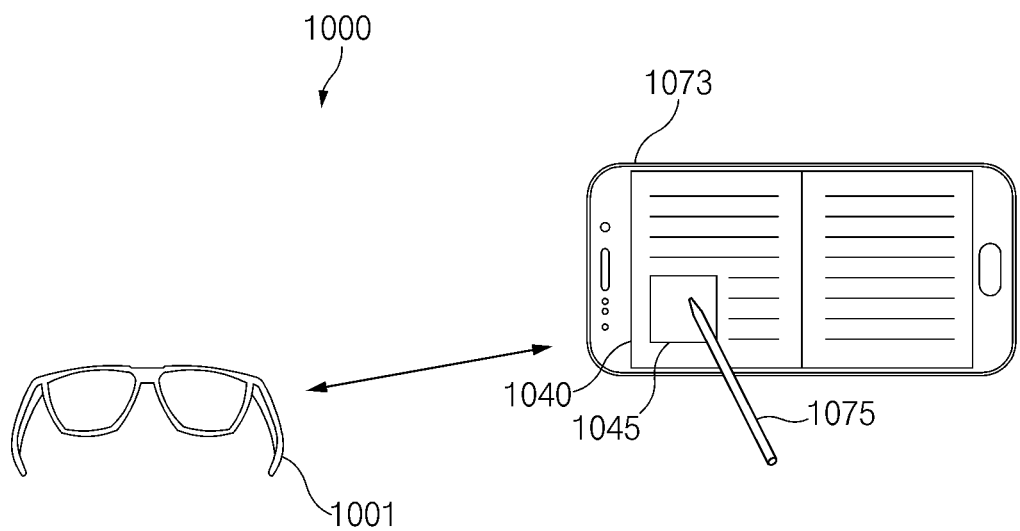
FIG. 10 is a diagram illustrating an operation of associating an external object in an electronic form with virtual content by an electronic device according to an embodiment of the disclosure.

FIG. 10 is a diagram illustrating an operation of associating an external object in an electronic form with virtual content by an electronic device according to an embodiment of the disclosure. Operations of an electronic device (e.g., the electronic device 501 of FIG. 5) described below may be performed by a processor (e.g., the processor 540 of FIG. 5) of the electronic device.

Referring to FIG. 10, in diagram 1000 an electronic device 1001 may communicate with an external electronic device 1073 (e.g., a third external electronic device 573 of FIG. 5) through a network (e.g., a network 551 of FIG. 5). According to an embodiment, the external electronic device 1073 may be an electronic device that provides an external object 1040 in an electronic form. According to an embodiment, the external electronic device 1073 may display the external object 1040 through a display. For example, the external object 1040 may be an electronic document or a screen of a device for displaying the electronic document.

According to an embodiment, the external electronic device 1073 may receive a user input of a user that specifies a specific area 1045 on an external object. For example, the external electronic device 1073 may receive a user input for specifying the specific area 1045 on the external object 1040 through a touch panel. For example, the user input may include a touch input using a stylus pen 1075 communicating with the external electronic device 1073. According to an embodiment, the external electronic device 1073 may transmit a user input received from a user to the electronic device 1001 through a network.

According to an embodiment, the electronic device 1001 may store information on the external object 1040 by itself, or store information on the external object 1040 by receiving the information from the external electronic device 1073. For example, the information on the external object 1040 may include at least one of a file corresponding to the external object 1040, page information of at least one page included in the external object 1040, and/or the page number of a current page being displayed on the external electronic device 1073. The electronic device 1001 may detect the specific area 1045 on the external object 1040 specified by a user input based on the user input received from the external electronic device 1073.

According to an embodiment, the electronic device 1001 may extract at least one image, which is obtained from a time point when a user input for specifying the specific area 1045 is received to a predetermined end time point from the external electronic device 1073, from a plurality of consecutive images obtained by using a camera (e.g., the second camera described above with reference to FIG. 4) of the electronic device 1001 or an external electronic device (e.g., the first external electronic device 571 of FIG. 5), and may associate the at least one image with the specific area 1045. For the predetermined end time and a method of extracting at least one image obtained from the time point when the electronic device 1001 receives a user input for specifying the specific area 1045 to the predetermined end time point, the above description may be referred to.

According to an embodiment, a plurality of consecutive images may correspond to a video, and at least one image extracted from the plurality of consecutive images may correspond to at least a portion of a video. According to an embodiment, the electronic device 1001 may extract at least a part of the video corresponding to a section from a time point when receiving a user input for specifying the specific area 1045 from the external electronic device 1073 to a predetermined end time point from the video acquired using a camera of the electronic device 1001 or an external electronic device, and may generate a video clip. The electronic device 1001 may associate the generated video clip with the specific area 1045.

Hereinafter, a method of providing an index of virtual content associated with an external object by an electronic device according to an embodiment will be described with reference to FIG. 11.

Figure 11:
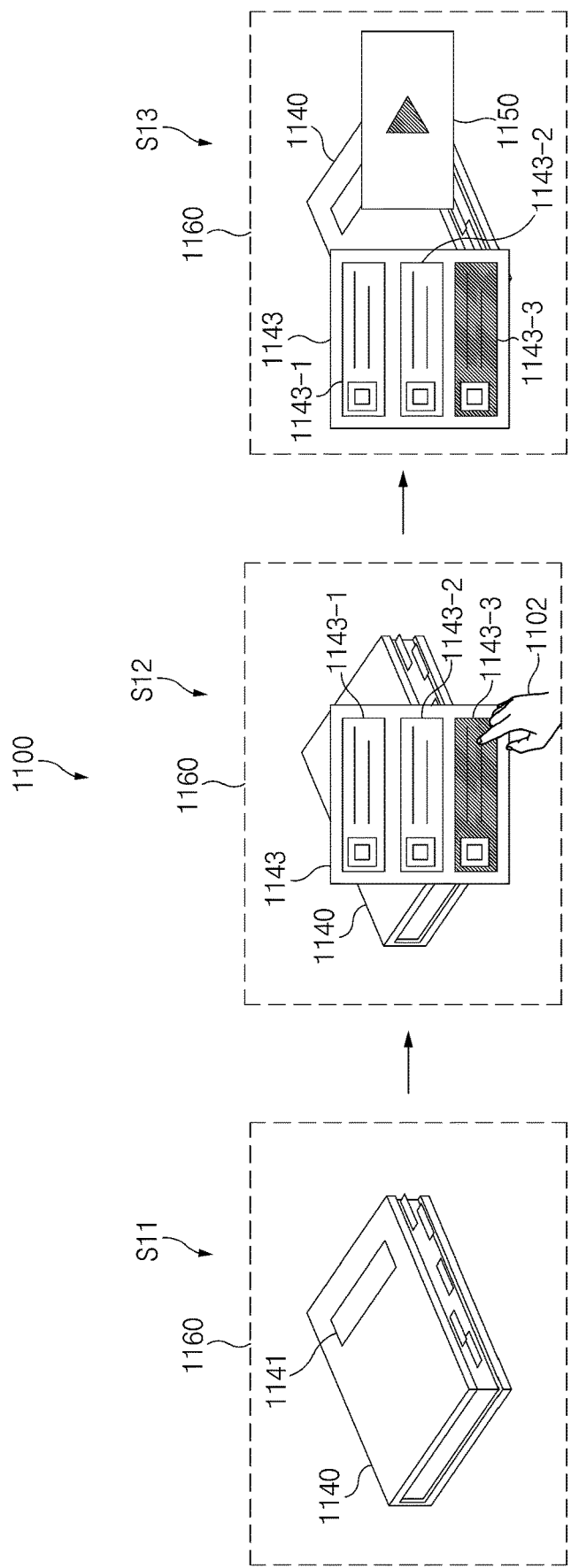
FIG. 11 is a diagram illustrating a method of providing an index of virtual content associated with an external object by an electronic device according to an embodiment of the disclosure.

FIG. 11 is a diagram illustrating a method of providing an index of virtual content associated with an external object by an electronic device according to an embodiment of the disclosure.

Operations of the electronic device (e.g., the electronic device 401 of FIG. 4 or the electronic device 501 of FIG. 5) described below may be performed by a processor of the electronic device (e.g., the processor 440 of FIG. 4 or the processor 540 of FIG. 5).

Referring to FIG. 11, in diagram 1100 a field of view 1160 may correspond to the field of view of a user of an electronic device according to an embodiment. According to an embodiment, the field of view 1160 may be an area viewed by a user through a display (e.g., the display 420 of FIG. 4 or the display 520 of FIG. 5) of the electronic device. According to an embodiment, the field of view 1160 may correspond to at least a part of a photographing area of a camera (e.g., the first camera described above with reference to FIG. 4 or the camera 510 of FIG. 5) of an electronic device set to obtain an image corresponding to a direction corresponding to a user's gaze.

Referring to FIG. 11, in a first state S11, the electronic device may identify a book 1140 from an image obtained by using a camera. Hereinafter, the book 1140 may correspond to an external object disclosed in the disclosure. According to an embodiment, the electronic device may identify a title 1141 of the book 1140. For example, the electronic device may obtain a cover image of the book 1140 located within the field of view 1160 of a user by using a camera, and extract a feature point from the obtained cover image of the book 1140. The electronic device may identify the title 1141 of the book 1140 based on the extracted feature points. The electronic device may change from the first state S11 to a second state S12 according to the identification of the title 1141 of the book 1140.

In the second state S12, the electronic device may display an index list 1143 corresponding to the title 1141 of the book 1140. The electronic device may search for and display the index list 1143 corresponding to the title 1141 of the book 1140 identified in the first state S11, among index lists of each external object that are stored in a memory (e.g., the memory 430 of FIG. 4 or the memory 530 of FIG. 5) or an external electronic device (e.g., the second external electronic device 572 of FIG. 5).

According to an embodiment, the index list 1143 may include an object including index information of at least one virtual content (e.g., a video clip) associated with the book 1140. For example, when the book 1140 is associated with a first video clip, a second video clip, and a third video clip, the index list 1143 displayed by the electronic device may include a first object 1143-1 including index information of the first video clip, a second object 1143-2 including index information of the second video clip, and a third object

1143-3 including index information of the third video clip. According to an embodiment, the index information may include at least one of page number information of a page of the book 1140 associated with the video clip, annotation information of the video clip, and/or metadata of the video clip.

According to an embodiment, the electronic device may receive a user input for selecting an object included in the index list 1143. According to an embodiment, the user input may include a gesture input in which the user points to an object by using a hand 1102. The electronic device may recognize the user's gesture by using a camera. For example, the electronic device may receive a user input for selecting the third object 1143-3. As the electronic device receives a user input for selecting the third object 1143-3, the electronic device may change from the second state S12 to a third state S13.

In the third state S13, the electronic device may display a preview image 1150 of the third video clip corresponding to the third object 1143-3. According to an embodiment, the preview image 1150 of the third video clip may include an image or a video clip extracted from the third video clip. According to an embodiment, the electronic device may display the index list 1143 and the preview image 1150 together. Although not shown in FIG. 11, as the electronic device receives a user input for selecting an object (e.g., the first object 1143-1 or the second object 1143-2) other than the third object 1143-3 among the objects included in the index list 1143, the electronic device may display a preview image of a video clip corresponding to the selected object.

Hereinafter, a user interface for editing virtual content associated with an external object, provided by an electronic device according to an embodiment, will be described with reference to FIG. 12.

Figure 12:
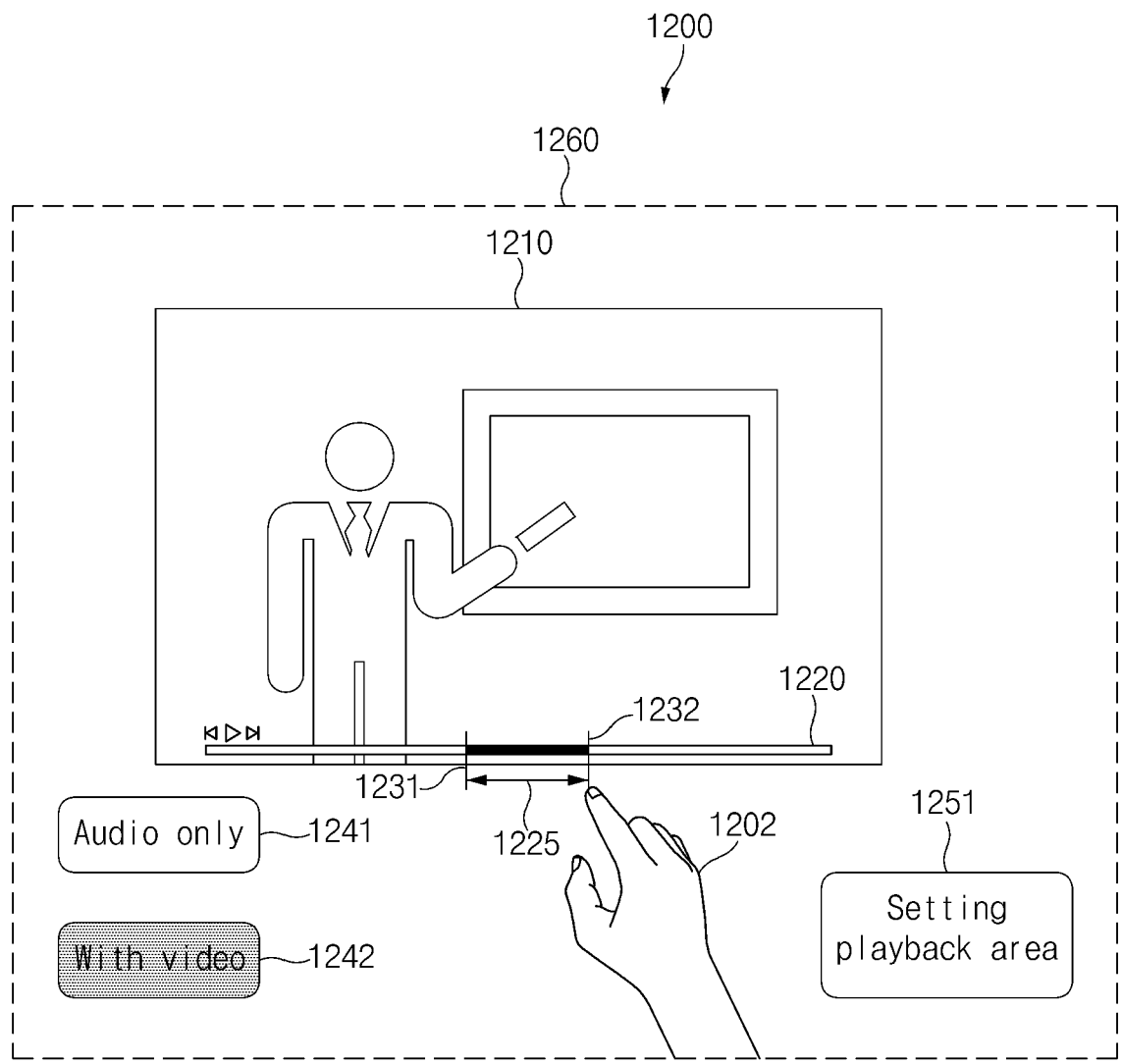
FIG. 12 is a diagram illustrating a user interface for editing virtual content related to an external object provided by an electronic device according to an embodiment of the disclosure.

FIG. 12 is a diagram illustrating a user interface for editing virtual content related to an external object provided by an electronic device according to an embodiment of the disclosure.

Operations of an electronic device (e.g., the electronic device 401 of FIG. 4 or the electronic device 501 of FIG. 5) described below may be performed by a processor (e.g., the processor 440 of FIG. 4 or the processor 540 of FIG. 5) of the electronic device.

Referring to FIG. 12, in diagram 1200 a field of view 1260 may correspond to a field of view of a user of an electronic device according to an embodiment. According to an embodiment, the field of view 1260 may be an area viewed by a user through a display (e.g., the display 420 of FIG. 4 or the display 520 of FIG. 5) of the electronic device. According to an embodiment, the field of view 1260 may correspond to at least a part of a photographing area of a camera (e.g., the first camera described above with reference to FIG. 4 or the camera 510 of FIG. 5) of an electronic device set to obtain an image corresponding to a direction corresponding to a user's gaze.

As a user input for selecting the second object 672 shown in FIG. 6B is received, the electronic device may display a user interface of FIG. 12. The second object 672 may be a virtual object to which an operation of displaying a user interface for editing a video clip (e.g., the video clip 625 of FIG. 6B) associated with an external object (e.g., the external object 640 of FIG. 6B) is mapped.

Referring to FIG. 12, the electronic device may display a playback screen 1210 of an original video of a video clip 1225 associated with an external object. The playback screen 1210 of the original video may include a refresh rate bar 1220. According to an embodiment, the electronic device may display a playback section corresponding to the video clip 1225 on the refresh rate bar 1220. A playback section corresponding to the video clip 1225 may be determined by a start point 1231 and an end point 1232.

According to an embodiment, the electronic device may adjust at least one of the start point 1231 and/or the end point 1232 based on a user input. For example, the user input may include a gesture input for changing locations of the start point 1231 and the end point 1232 on the refresh rate bar 1220 by a user using a hand 1202. According to an embodiment, the electronic device may reset the playback section of the video clip 1225 based on at least one of the start point 1231 and/or the end point 1232 changed based on a user input.

According to an embodiment, the electronic device may display at least one virtual object for selecting a playback format of the video clip 1225. For example, the electronic device may display a first object 1241 to which an operation of setting to reproduce only the audio data of the video clip 1225 is mapped, and a second object 1242 to which an operation of setting to reproduce both audio data and video data of the video clip 1225 is mapped. For example, the first object 1241 may be a button including text "Audio only", and the second object 1242 may be a button including text "With video". The electronic device may be set to reproduce only audio data when the video clip 1225 is reproduced based on a user input for selecting the first object 1241. The electronic device may be set to reproduce both audio data and video data when the video clip 1225 is reproduced based on a user input for selecting the second object 1242. For example, the user input for selecting the playback format of the video clip 1225 above-described may include a gesture input of selecting the first object 1241 or the second object 1242 by the user using the hand 1202.

According to an embodiment, the electronic device may display a third object 1251, which is a virtual object, to which the operation of displaying a user interface for setting the playback area of the video clip 1225 is mapped. For example, the third object 1251 may be a button including text "Setting playback area". The electronic device may display a user interface for setting a playback area when the video clip 1225 is played based on a user input for selecting the third object 1251. For example, the user input for selecting the third object 1251 may include a gesture input.

For example, as a user input for selecting the third object 1251 is received from a user, the electronic device may display a user interface for selecting one of a plurality of options for the playback area. For example, the plurality of options may include an area adjacent to a specific area on an external object associated with the video clip 1225, a surrounding area of the external object, an area on another external object located within the field of view 1260, and/or a user-specified area. The electronic device may set the playback area of the video clip 1225 as a playback area corresponding to the selected option based on a user input for selecting one from the plurality of options.

As another example, when a user input for selecting the third object 1251 is received from a user, the electronic device may display a preview screen of the video clip 1225 overlapping the real environment corresponding to the field of view of the user according to the user's input. The electronic device may set the changed location of the preview screen as a playback area, based on a user input for changing the location of the preview screen. According to an embodiment, the electronic device may determine the location of the preview screen as a relative location to an external object included in the field of view of a user.

Hereinafter, a playback area in which an electronic device reproduces virtual content associated with an external object according to an embodiment will be described with reference to FIG. 13.

Figure 13:
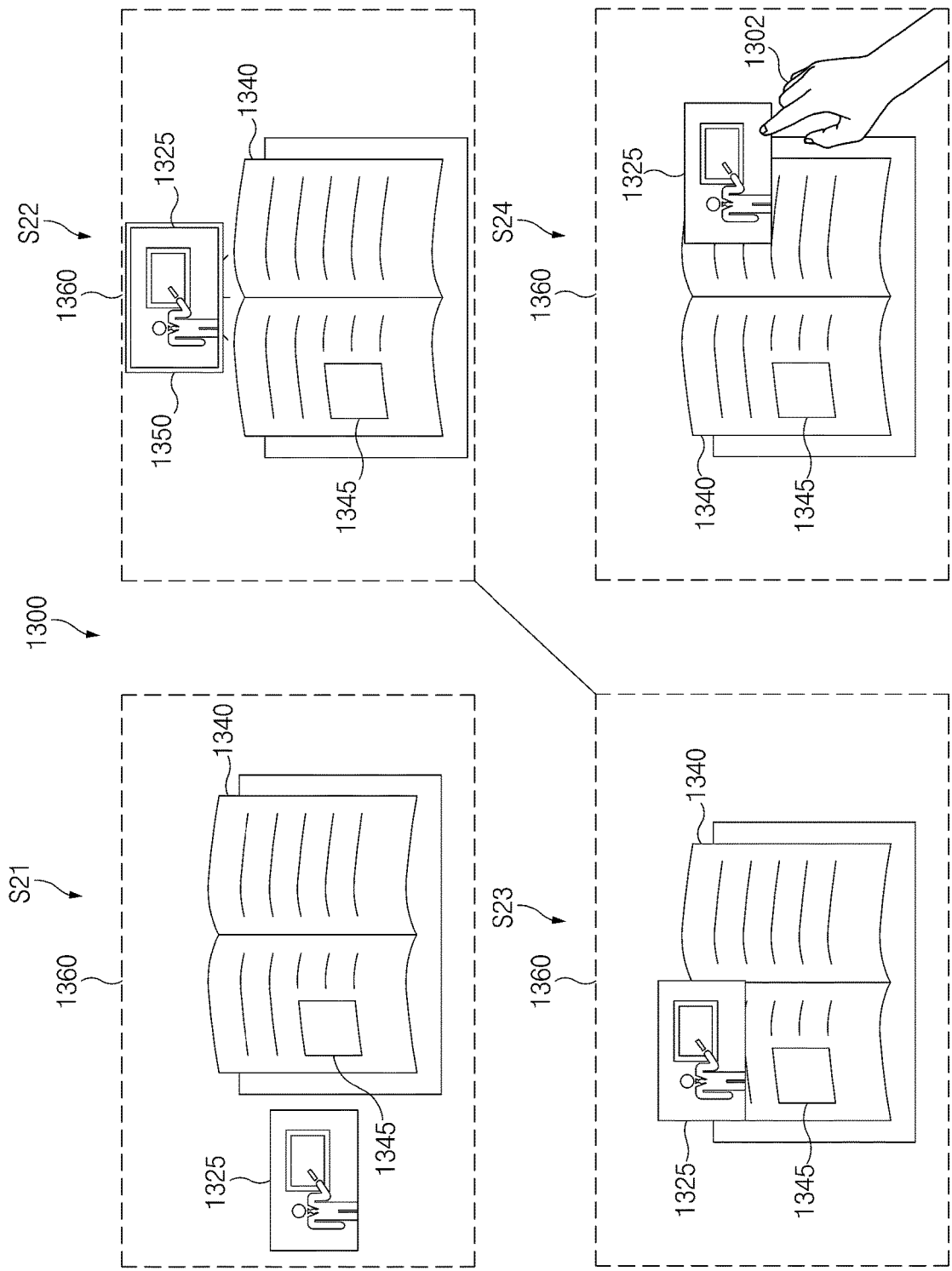
FIG. 13 is a diagram illustrating a playback area in which an electronic device reproduces virtual content associated with an external object according to an embodiment of the disclosure.

FIG. 13 is a diagram illustrating a playback area in which an electronic device reproduces virtual content associated with an external object according to an embodiment of the disclosure.

Operations of an electronic device (e.g., the electronic device 401 of FIG. 4 or the electronic device 501 of FIG. 5) described below may be performed by a processor (e.g., the processor 440 of FIG. 4 or the processor 540 of FIG. 5) of the electronic device.

Referring to FIG. 13, in diagram 1300 a field of view 1360 may correspond to a field of view of a user of an electronic device according to an embodiment. According to an embodiment, the field of view 1360 may be an area viewed by a user through a display (e.g., the display 420 of FIG. 4 or the display 520 of FIG. 5) of the electronic device. According to an embodiment, the field of view 1360 may correspond to at least a part of a photographing area of a camera (e.g., the first camera described above with reference to FIG. 4 or the camera 510 of FIG. 5) of an electronic device set to obtain an image corresponding to a direction corresponding to a user's gaze.

According to an embodiment, the electronic device may set a playback area of a video clip 1325 associated with an external object 1340 based on a user input. In this regard, reference may be made to the description with reference to FIG. 12.

In a first state S21, the electronic device may be in a state in which the playback area of the video clip 1325 is set as the surrounding area of the external object 1340. When the video clip 1325 is reproduced, the electronic device may display the video clip 1325 in a surrounding area of the external object 1340.

In a second state S22, the electronic device may be in a state in which the playback area of the video clip 1325 is set as one area on another external object 1350 located within the field of view 1360. When the video clip 1325 is reproduced, the electronic device may display the video clip 1325 on an area on the other external object 1350 located within the field of view 1360. According to an embodiment, the electronic device may display the video clip 1325 to overlap with the other external object 1350 located within the field of view 1360.

In a third state S23, the electronic device may be in a state in which the playback area of the video clip 1325 is set as an area adjacent to a specific area 1345 on the external object 1340 associated with the video clip 1325. When the video clip 1325 is reproduced, the electronic device may display the video clip 1325 in an area adjacent to the specific area 1345 on the external object 1340 associated with the video clip 1325.

In a fourth state S24, the electronic device may be in a state in which the playback area of the video clip 1325 is set as a user-specified area. For example, the electronic device may receive a user input while the video clip 1325 is being reproduced, and set a playback area of the video clip 1325 based on the received user input. For example, the user input for setting the playback area during playback of the video clip 1325 may include a gesture in which the user drags the video clip 1325 using a hand 1302 and drops the video clip 1325 to another location.

As another example, the electronic device may display the video clip 1325 in a preset playback area based on a user input before the video clip 1325 is played.

Hereinafter, a method for providing an augmented reality service by an electronic device according to an embodiment will be described with reference to FIG. 14.

Figure 14:
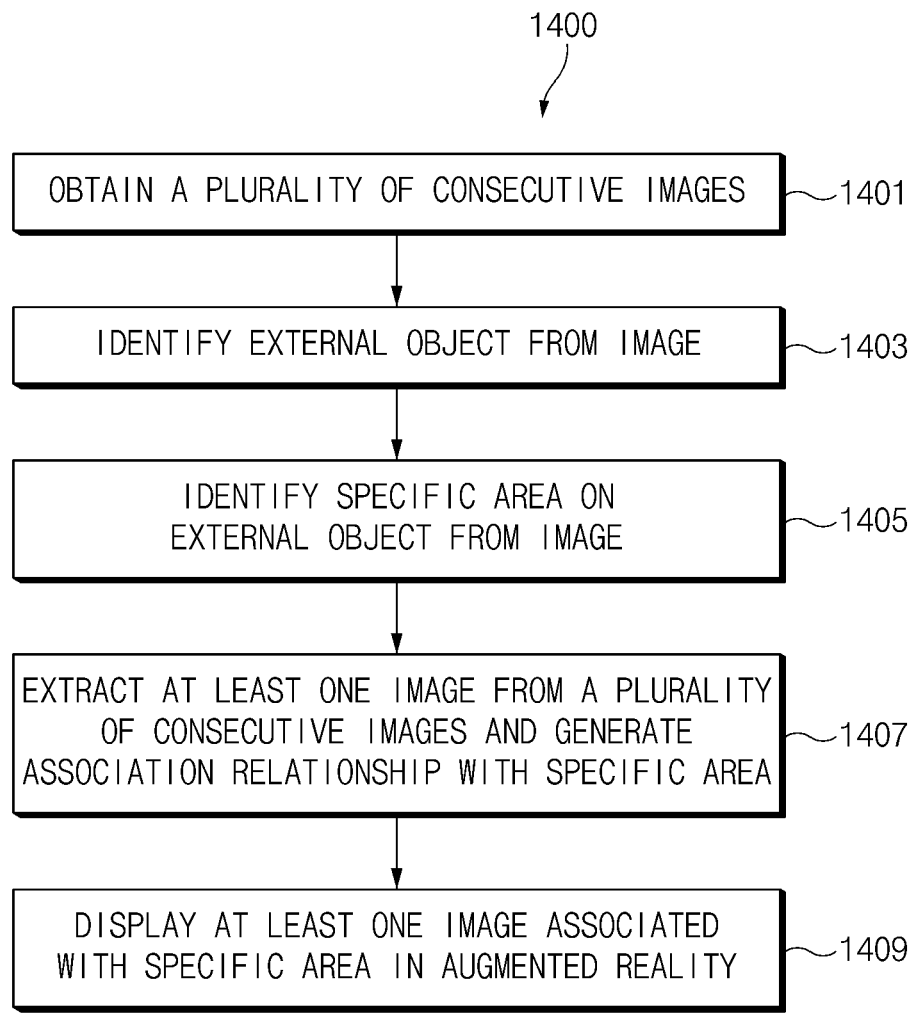
FIG. 14 is a flowchart illustrating an operation of an electronic device according to an embodiment of the disclosure.

FIG. 14 is a flowchart illustrating an operation of an electronic device according to an embodiment of the disclosure.

Operations of an electronic device (e.g., the electronic device 401 of FIG. 4 or the electronic device 501 of FIG. 5) described below may be performed by a processor (e.g., the processor 440 of FIG. 4 or the processor 540 of FIG. 5) of the electronic device.

Referring to FIG. 14, in flowchart 1400, an electronic device may obtain a plurality of consecutive images, in operation 1401. According to an embodiment, the electronic device may obtain a plurality of consecutive images by using a camera based on a first user input of a user of the electronic device. For example, the electronic device may activate a camera based on the first user input and start to obtain an image corresponding to a user's gaze or a user's gaze direction by using the camera.

According to an embodiment, the electronic device may obtain a plurality of consecutive images corresponding to the user's gaze or the user's gaze direction by using the camera. According to an embodiment, the electronic device may start to obtain a plurality of consecutive images by using a camera based on a first user input, and may terminate the acquisition of the plurality of consecutive images based on another user input that is inputted after the first user input and different from the first user input. According to an embodiment, the first user input may include a gesture input or a voice input. According to an embodiment, the plurality of consecutive images obtained while the electronic device operates in a mode may be one video (e.g., the video 610).

In operation 1403, the electronic device may identify an external object from the image. According to an embodiment, the electronic device may identify an external object from the image obtained using a camera. According to an embodiment, the electronic device may extract a feature point from an image of an external object obtained by using a camera, and identify the external object based on the extracted feature point.

According to an embodiment, the external object may include a physical object that a user is tangible. As an example, the external object may be a printed material such as a book, newspaper, magazine, or work book, or a page thereof. As another example, the external object (e.g., the external object 1040 of FIG. 10) may be an electronic document or a screen of a device (e.g., the third external electronic device 573 of FIG. 5) displaying the electronic document. According to various embodiments disclosed in the disclosure, the external object, which is a document for providing information, may include at least one page and may include an electronic document and a non-electronic document. In operation 1405, the electronic device may identify a specific area on the external object from the image. According to an embodiment, the electronic device may identify a specific area on the external object specified by the second user input of a user, from the image of the external object obtained by using the camera. According to an embodiment, the electronic device may identify at least one page included in the external object from the image of the external object. According to an embodiment, the electronic device provides a page number of at least one page included in the external object and/or at least one of at least one content (e.g., a letter, number, figure, image, graph, or table) included in the page, based on the feature point extracted from the image of the external object. For example, the electronic device may identify a specific area on the external object corresponding to the second user input by identifying the page number of the page of the external object corresponding to the second user input and content.

According to an embodiment, the second user input may include an input for specifying a specific area (e.g., the specific area 945 of FIGS. 9A to 9D or the specific area 1045 of FIG. 10) on the external object. For example, the second user input may be a gesture input of pointing to a specific area on the external object or a gesture input (e.g., writing or drawing using an actual pen) for drawing a shape specified in the specific area on the external object. As another example, the second user input may be a touch input using an electronic pen (e.g., the stylus pen 1075 of FIG. 10) communicating with the electronic device, or a button input using a button provided in the electronic pen. As still another example, the second user input may include a user's gaze looking at a specific area on an external object and an utterance (e.g., the user utterance 955 in FIG. 9D) to which an operation of extracting at least one image obtained using a camera is mapped.

In operation 1407, the electronic device may extract at least one image from a plurality of consecutive images and generate an association relationship with a specific area. According to an embodiment, the electronic device may extract at least one image from a plurality of consecutive images obtained by using a camera and associate the at least one image with a specific area. According to an embodiment, the electronic device may extract at least one image obtained from the input time point of a second user input to a predetermined end time point from the plurality of consecutive images and associate the at least one image with a specific area. According to an embodiment, the predetermined end time point may include a time point when a specified time elapses from the input time point of the second user input. According to an embodiment, the predetermined end time point may include an input time point of a user input for specifying an area other than the specific area specified by the second user input among areas on the external object. According to an embodiment, the predetermined end time point may include a time point at which the feature point of the external object is changed. For example, when the page of the external object is changed, the feature point of the external object may be changed. According to an embodiment, the predetermined end time point may include a time point at which the user's gaze is changed out of a specified range. For example, when the user's gaze moves away from the specific area by a specified distance or more, the electronic device may determine that the user's gaze has changed by the specified range or more.

According to an embodiment, an operation of obtaining a plurality of consecutive images by the electronic device may include an operation of recording a video by the electronic device. According to an embodiment, the operation of extracting at least one image from the plurality of consecutive images by the electronic device may include the operation of extracting at least a part of a video in real time by the electronic device while recording the video. According to an embodiment, the electronic device may generate a video clip (e.g., the video clip 625 of FIG. 6A) by extracting at least a part of the video from the video being recorded. According to an embodiment, the electronic device may associate a video clip with a specific area.

According to an embodiment, when obtaining a plurality of consecutive images by using a camera, the electronic device may obtain audio data by receiving surrounding sound at the time of obtaining the plurality of consecutive images by using a microphone. For example, the electronic device may activate a camera and a microphone based on the first user input, obtain video data by using the camera, and obtain audio data by using the microphone. For example, a video clip with which the electronic device associates a specific area on an external object may include video data and audio data. According to an embodiment, the video clip may correspond to a specified section of the video that the electronic device starts to obtain by using the camera based on the first user input. The specified section may correspond to a section from a first point (e.g., the first point 631 of FIG. 6A) to a second point (e.g., the second point 632 of FIG. 6A). According to an embodiment, each point of the video may correspond to a time point at which an image corresponding to each point is obtained. According to an embodiment, the first point may correspond to an input time of the second user input. According to an embodiment, the second point may correspond to a predetermined end time point.

In the above-described embodiment, a case in which the electronic device obtains a plurality of consecutive images by using a camera is exemplified, but the embodiment is not limited thereto, and the electronic device may obtain a plurality of consecutive images by receiving the plurality of consecutive images through a communication circuit (e.g., the communication circuit 550 of FIG. 5) from an external electronic device (e.g., the first external electronic device 571 in FIG. 5). For example, the plurality of consecutive images received by the electronic device from an external electronic device may include images obtained by using a camera of the external electronic device or a plurality of consecutive images output (or reproduced) by the external electronic device. The electronic device may extract at least one image from a plurality of consecutive images obtained by using the external electronic device based on the second user input and associate the at least one image with a specific area. For example, the electronic device may associate at least one image photographed by the camera of the external electronic device from the input time point of the second user input to the predetermined end time point with the specific area. As another example, the electronic device may associate at least one image output (or reproduced) by the external electronic device from the input time of the second user input to the predetermined end time point with the specific area.

According to an embodiment, as the electronic device associates the extracted at least one image with a specific area, a specified virtual object (e.g., the first object 951 of FIG. 9A, the second object 952 of FIG. 9A, or the fourth object 954 of FIG. 9C) may be mapped to a specific area. According to an embodiment, the electronic device may use a specified virtual object mapped to a specific area as a marker. According to an embodiment, a marker may be referred to as a medium for augmenting virtual content associated with the specific area 645. According to an embodiment, as the electronic device identifies a specific area on the external object, the specified virtual object may be displayed while overlapping the specific area.

According to various embodiments, the electronic device may use a real object printed on an external object or a real object (e.g., the third object 953 of FIG. 9B) generated by drawing using a user's writing instrument on the external object as a marker.

According to an embodiment, the electronic device may store at least one of a plurality of consecutive images obtained by using a camera or at least one image extracted therefrom in a memory (e.g., the memory 430 of FIG. 4). According to various embodiments, the electronic device may transmit at least one of a plurality of consecutive images or at least one image extracted therefrom to an external storage device (e.g., the second external electronic device 572 of FIG. 5) and may store it in the external storage device. According to an embodiment, when storing at least one image extracted from a plurality of consecutive images, the electronic device may store the metadata together. For example, the metadata may be data associated with a video clip for identifying or searching for a video clip including the at least one image. According to an embodiment, the metadata may include at least one of information on a time point when a video clip including at least one image is generated, information on a place (e.g., global positioning system, GPS) where the video clip is generated, and/or information obtained on the video clip. According to an embodiment, the information obtained on the video clip may include at least one of information extracted from the video clip by the electronic device and/or information on the video clip which the electronic device receives from a user. For example, in the case where the video clip is a video clip obtained by recording a lecture, when storing the video clip, the electronic device may store the video clip together with at least one of a timestamp information when the video clip is generated, GPS information of the electronic device 401 when the video clip is generated, a lecturer, a lecture material used in a lecture, and/or other information obtained in relation to the lecture. According to an embodiment, the information on a time point when the video clip is generated may correspond to a time point when the electronic device detects or receives a second user input for associating the video clip with an external object. According to an embodiment, after performing operations 1401, 1403, 1405, and 1407, the electronic device may terminate acquisition of a plurality of consecutive images based on a user input received before performing operation 1409.

In operation 1409, the electronic device may display at least one image associated with a specific area in augmented reality. According to an embodiment, the electronic device may receive the third user input of a user corresponding to a specific area. According to an embodiment, the third user input may include a user input for displaying (or playing back) at least one image associated with a specific area. For example, the third user input may include a gesture input of pointing to a specific area. As another example, the third user input may include a gesture input of pointing to a specific area by using an electronic pen communicating with the electronic device and a button input provided in an electronic pen received at a specified time interval from the gesture input. As still another example, the third user input may include a user's gaze of looking at a specific area and an utterance with which an operation of displaying at least one image associated with the specific area is mapped. According to an embodiment, the electronic device may use an eye-tracking sensor (e.g., the first eye-tracking sensor 276-1 and the second eye-tracking sensor 276-2 of FIG. 2) to identify a specified area on an external object that the user is looking at. According to an embodiment, when receiving the third user input, the electronic device may display at least one image associated with a specific area on an external object in augmented reality on a display (e.g., the display 420 of FIG. 4 or the display 520 of FIG. 5).

For example, when the electronic device uses a specified virtual object as a marker, the electronic device may display at least one image associated with a specific area based on a third user input corresponding to a specified virtual object that is displayed on an external object while overlapping the specific area. As another example, when the electronic device uses a real object on an external object as a marker, the electronic device may display at least one image associated with a specific area based on a third user input corresponding to a real object on an external object. For example, the real object may include an object printed on an external object or an object generated by drawing using a user's writing instrument. According to an embodiment, the real object may correspond to content (e.g., an image, a letter, a number, a table, or a graph) included in the page of an external object.

According to an embodiment, the electronic device may display at least one image associated with a specific area in augmented reality on a display based on the third user input. According to an embodiment, the electronic device may reproduce a video clip including the at least one image in a playback area set based on the third user input. For example, the playback area may include a surrounding area of a specific area on an external object associated with the video clip, a surrounding area of an external object, a user-specified area, or a specified area on a space implemented as an AR environment.

According to an embodiment, the electronic device may reproduce a video clip according to a playback format set based on a user input. For example, the playback format may include a format for reproducing only audio data of the video clip, a format for reproducing only video data of the video clip, or a format for reproducing both audio data and video data of the video clip.

According to an embodiment, the electronic device may display a bookmark for an external object. According to an embodiment, the electronic device may display a bookmark corresponding to a page including a specific area associated with a video clip. For example, the electronic device may display a bookmark by displaying a specified icon and a page number on an edge of a page of an external object. According to an embodiment, the electronic device may display a video clip associated with a specific area in a page corresponding to the bookmark or information about the video clip based on a user interaction for the bookmark.

According to an embodiment disclosed in the disclosure, an electronic device (e.g., the electronic device 101 of FIG. 1, the electronic device 201 of FIG. 2, the electronic device 401 of FIG. 4, the electronic device 601 of FIGS. 6A and 6B, the electronic device 701 of FIGS. 7A and 7B, or the electronic device 1001 of FIG. 10) that is wearable on a part of a body of a user may include a camera (e.g., the camera module 180 of FIG. 1, the first camera 280-1, the second camera 280-2, and/or the third camera 280-3 of FIG. 2, or the camera 410 of FIG. 4); a display (e.g., the display module 160 of FIG. 1, the first display 261-1 and/or the second display 261-2 of FIG. 2, the display 361 of FIG. 3, or the display 420 of FIG. 4); a memory (e.g., the memory 130 of FIG. 1, or the memory 430 of FIG. 4); and a processor (e.g., the processor 120 of FIG. 1, or the processor 440 of FIG. 4) operatively coupled to the camera, the display and the memory. The memory may store one or more instructions which, when executed, cause the processor to obtain a plurality of consecutive images by using the camera based on a first user input of the user, identify an external object from an image obtained by using the camera, identify a specific area on the external object specified by a second user input of the user from the image, extract at least one image from the plurality of consecutive images and associate the at least one image with the specific area, and display the at least one image associated with the specific area in augmented reality on the display when receiving a third user input of the user corresponding to the specific area.

According to an embodiment disclosed in the disclosure, the camera may include a first camera and a second camera. The processor may obtain the plurality of consecutive images by using the second camera based on the first user input, and identify at least one of the external object or the specific area on the external object from an image obtained by using the first camera.

According to an embodiment disclosed in the disclosure, the external object may include at least one page and the page may include at least one content. The specific area on the external object may include at least a partial area in the at least one page, and correspond to a specific content specified by the second user input among the at least one content.

According to an embodiment disclosed in the disclosure, the processor may obtain an image of the external object by using the camera, extract a feature point from the image of the external object, and identify the external object based on the extracted feature point.

According to an embodiment disclosed in the disclosure, the processor may obtain a video by using the camera based on the first user input, extract at least a portion of the video based on the second user input to generate a video clip, and associate the video clip with the specific area.

According to an embodiment disclosed in the disclosure, the instructions may cause the processor to store the extracted at least one image together with metadata of the at least one image in the memory or an external storage device.

According to an embodiment disclosed in the disclosure, the metadata may include at least one of information on a time point at which the at least one image is extracted, information on a location at which the at least one image is obtained, or information on the at least one image obtained by the processor.

According to an embodiment disclosed in the disclosure, the time point information may include a timestamp of an input time point of the second user input.

According to an embodiment disclosed in the disclosure, the at least one image may include at least one image obtained from the plurality of consecutive images from an input time point of the second user input to a predetermined end time point.

According to an embodiment disclosed in the disclosure, the second user input may include a gesture input of pointing to an area on the external object or a gesture input of drawing a specified shape in an area on the external object.

According to an embodiment disclosed in the disclosure, the second user input may include an input using an electronic pen communicating with the electronic device.

According to an embodiment disclosed in the disclosure, the predetermined end time point may include a time point when a specified time elapses from the input time point of the second user input, an input time point of a fourth user input of the user that points to an area different from the specific area among areas on the external object after the input time point of the second user input, a time point when a gaze of the user is changed out of a specified range, or a time point when a feature point of an image of the external object is changed.

According to an embodiment disclosed in the disclosure, the instructions may cause the processor to generate an index of data associated with at least one area on the external object, and display an index list including the index on the display in augmented reality according to the external object being identified. The data associated with the area may include the at least one image.

According to an embodiment disclosed in the disclosure, the instructions may cause the processor to adjust a section in which a video clip corresponding to the at least one image associated with the specific area is extracted from a video corresponding to the plurality of consecutive images based on the user input of the user.

According to an embodiment disclosed in the disclosure, the instructions may cause the processor to determine a playback format of a video clip corresponding to the at least one image associated with the specific area based on a user input of the user. The playback format may include a format related to playback of at least one of audio data of the video clip or video data of the video clip.

According to an embodiment disclosed in the disclosure, the instructions may cause the processor to determine a playback area of the at least one image in an augmented reality environment provided through the display based on a user input of the user.

According to an embodiment disclosed in the disclosure, the external object includes at least one page. The instructions may cause the processor to generate a bookmark corresponding to a page including the specific area associated with the at least one image, and display the bookmark in augmented reality on the display according to the external object being identified. The bookmark may include page number information of the page including the specific area.

According to an embodiment disclosed in the disclosure, an electronic device (e.g., the electronic device 101 of FIG. 1, the electronic device 201 of FIG. 2, the electronic device 501 of FIG. 5, the electronic device 601 of FIGS. 6A and 6B, the electronic device 701 of FIGS. 7A and 7B, the electronic device 801 of FIG. 8, or the electronic device 1001 of FIG. 10) that is wearable on a part of a body of a user may include a camera (e.g., the camera module 180 of FIG. 1, the first camera 280-1, the second camera 280-2, and/or the third camera 280-3 of FIG. 2, or the camera 510 of FIG. 5); a communication circuit (e.g., the communication module 190 of FIG. 1 or the communication circuit 550 of FIG. 5); a display (e.g., the display module 160 of FIG. 1, the first display 261-1 and/or the second display 261-2 of FIG. 2, the display 361 of FIG. 3, or the display 520 of FIG. 5); a memory (e.g., the memory 130 of FIG. 1, or the memory 530 of FIG. 5); and a processor (e.g., the processor 120 of FIG. 1, or the processor 540 of FIG. 5) operatively coupled to the camera, the communication circuit, the display and the memory. The memory may store one or more instructions which, when executed, cause the processor to receive a plurality of consecutive images from a first external electronic device (e.g., the first external electronic device 571 of FIG. 5) by using the communication circuit based on a first user input of the user, identify an external object from an image obtained by using the camera, identify a specific area on the external object specified by a second user input of the user from the image, extract at least one image from the plurality of consecutive images and associate the at least one image with the specific area, and display the at least one image associated with the specific area in augmented reality on the display when receiving a third user input of the user corresponding to the specific area.

According to an embodiment disclosed in the disclosure, the instructions may cause the processor to transmit the at least one image associated with the specific area to a second external electronic device by using the communication circuit. The second external electronic device may store at least one of the plurality of consecutive images or the at least one image.

According to an embodiment disclosed in the disclosure, a method of providing an augmented reality environment of an electronic device (e.g., the electronic device 101 of FIG. 1, the electronic device 201 of FIG. 2, the electronic device 401 of FIG. 4, the electronic device 501 of FIG. 5, the electronic device 601 of FIGS. 6A and 6B, the electronic device 701 of FIGS. 7A and 7B, the electronic device 801 of FIG. 8, or the electronic device 1001 of FIG. 10) that is wearable on a part of a body of a user may include obtaining a plurality of consecutive images by using a camera (e.g., the camera module 180 of FIG. 1, the first camera 280-1, the second camera 280-2, and/or the third camera 280-3 of FIG. 2, or the camera 410 of FIG. 4) based on a first user input of the user; identifying an external object from the image obtained by using the camera; identifying a specific area on the external object specified by a second user input of the user from the image; extracting at least one image from the plurality of consecutive images and associating the at least one image with the specific area; and displaying the at least one image associated with the specific area in augmented reality on the display (e.g., the display module 160 of FIG. 1, the first display 261-1 and/or the second display 261-2 of FIG. 2, the display 361 of FIG. 3, or the display 420 of FIG. 4) when receiving a third user input of the user corresponding to the specific area.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device that is wearable on a body part of a user, the electronic device comprising:
   a camera;
   a display;
   a memory; and
   a processor operatively connected to the camera, the display, and the memory,
   wherein the memory stores one or more instructions which, when executed, cause the processor to:
     based on a first user input of the user, obtain a plurality of consecutive images by using the camera,
     identify an external object from an image obtained by using the camera,
     identify a specific area on the external object specified by a second user input of the user from the image,
     extract at least one image from the plurality of consecutive images and associate the at least one image with the specific area, and
     in response to receiving a third user input of the user corresponding to the specific area, display the at least one image associated with the specific area in augmented reality on the display, and
   wherein the at least one image comprises at least one image obtained from the plurality of consecutive images from an input time point of the second user input to a predetermined end time point.

2. The electronic device of claim 1,
   wherein the camera comprises a first camera and a second camera, and
   wherein the instructions, when executed, further cause the processor to:
     based on the first user input, obtain the plurality of consecutive images by using the second camera, and
     identify at least one of the external object or the specific area on the external object from the image obtained by using the first camera.

3. The electronic device of claim 1,
   wherein the external object comprises at least one page,
   wherein the page comprises at least one content, and
   wherein the specific area on the external object comprises at least a partial area in the at least one page and corresponds to specific content specified by the second user input among the at least one content.

4. The electronic device of claim 1, wherein the instructions, when executed, further cause the processor to:
   obtain an image of the external object by using the camera,
   extract a feature point from the image of the external object, and
   based on the extracted feature point, identify the external object.

5. The electronic device of claim 1, wherein the instructions, when executed, further cause the processor to:
   based on the first user input, obtain a video by using the camera,
   based on the second user input, extract at least one portion of the video and generate a video clip using the at least one portion of the video, and
   associate the video clip with the specific area.

6. The electronic device of claim 1, wherein the instructions, when executed, further cause the processor to store the at least one image together with metadata of the at least one image in the memory or an external storage device.

7. The electronic device of claim 6, wherein the metadata comprise at least one of information on a time point at which the at least one image is extracted, information on a location at which the at least one image is obtained, or information on the at least one image obtained by the processor.

8. The electronic device of claim 7, wherein the time point information comprises a timestamp of an input time point of the second user input.

9. The electronic device of claim 1, wherein the second user input comprises at least one of a gesture input of pointing to an area on the external object or a gesture input of drawing a specified shape in the area on the external object.

10. The electronic device of claim 1, wherein the second user input comprises an input using an electronic pen communicating with the electronic device.

11. The electronic device of claim 1, wherein the predetermined end time point comprises at least one of:
    a time point when a specified time elapses from the input time point of the second user input;
    an input time point of a fourth user input of the user that points to an area different from the specific area among areas on the external object after the input time point of the second user input;
    a time point when a gaze of the user is changed out of a specified range; or
    a time point when a feature point of an image of the external object is changed.

12. The electronic device of claim 1,
    wherein the instructions, when executed, further cause the processor to:
      generate an index of data associated with at least one area on the external object, and
      display an index list including the index on the display in augmented reality according to the external object being identified, and wherein the data associated with the area comprise the at least one image.

13. The electronic device of claim 1, wherein the instructions, when executed, further cause the processor to, based on a user input of the user, adjust a section in which a video clip corresponding to the at least one image associated with the specific area is extracted from a video corresponding to the plurality of consecutive images.

14. The electronic device of claim 1,
wherein the instructions, when executed, further cause the processor to, based on a user input of the user, determine a playback format of a video clip corresponding to the at least one image associated with the specific area, and
wherein the playback format comprises a format related to playback of at least one of audio data of the video clip or video data of the video clip.

15. The electronic device of claim 1, wherein the instructions, when executed, further cause the processor to, based on a user input of the user, determine a playback area of the at least one image in an augmented reality environment provided through the display.

16. The electronic device of claim 1,
wherein the external object comprises at least one page,
wherein the instructions, when executed, further cause the processor to:
generate a bookmark corresponding to a page including the specific area associated with the at least one image, and
display the bookmark in augmented reality on the display according to the external object being identified, and
wherein the bookmark comprises page number information of the page including the specific area.

17. An electronic device that is wearable on a body part of a user, the electronic device comprising:
a camera;
a communication circuit;
a display;
a memory; and
a processor operatively connected to the camera, the communication circuit, the display, and the memory,
wherein the memory stores one or more instructions which, when executed, cause the processor to:
based on a first user input of the user, receive a plurality of consecutive images from a first external electronic device by using the communication circuit,
identify an external object from an image obtained by using the camera,
identify a specific area on the external object specified by a second user input of the user from the image,
extract at least one image from the plurality of consecutive images and associate the at least one image with the specific area, and
in response to receiving a third user input of the user corresponding to the specific area, display the at least one image associated with the specific area in augmented reality on the display, and
wherein the at least one image comprises at least one image obtained from the plurality of consecutive images from an input time point of the second user input to a predetermined end time point.

18. The electronic device of claim 17,
wherein the instructions, when executed, further cause the processor to transmit the at least one image associated with the specific area to a second external electronic device by using the communication circuit, and
wherein the second external electronic device is configured to store at least one of the plurality of consecutive images or the at least one image.

19. A method of providing an augmented reality environment of an electronic device that is wearable on a body part of a user, the method comprising:
based on a first user input of the user, obtaining a plurality of consecutive images by using a camera;
identifying an external object from an image obtained by using the camera;
identifying a specific area on the external object specified by a second user input of the user from the image;
extracting at least one image from the plurality of consecutive images and associating the extracted at least one image with the specific area; and
in response to receiving a third user input of the user corresponding to the specific area, displaying the at least one image associated with the specific area in augmented reality on a display,
wherein the at least one image comprises at least one image obtained from the plurality of consecutive images from an input time point of the second user input to a predetermined end time point.

* * * * *